(12) United States Patent
Zhu et al.

(10) Patent No.: US 11,570,832 B2
(45) Date of Patent: Jan. 31, 2023

(54) RATE ADJUSTMENT METHOD, APPARATUS, AND SYSTEM

(71) Applicant: Huawei Technologies Co., Ltd., Shenzhen (CN)

(72) Inventors: Qianghua Zhu, Beijing (CN); Fenqin Zhu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 184 days.

(21) Appl. No.: 17/107,520

(22) Filed: Nov. 30, 2020

(65) Prior Publication Data

US 2021/0120610 A1 Apr. 22, 2021

Related U.S. Application Data

(63) Continuation of application No. PCT/CN2019/088233, filed on May 24, 2019.

(30) Foreign Application Priority Data

Jun. 26, 2018 (CN) .......................... 201810669446.1

(51) Int. Cl.
- *H04W 4/00* (2018.01)
- *H04W 76/15* (2018.01)
- *H04W 76/11* (2018.01)
- *H04W 28/22* (2009.01)
- *H04W 36/08* (2009.01)

(52) U.S. Cl.
CPC .......... *H04W 76/15* (2018.02); *H04W 28/22* (2013.01); *H04W 36/08* (2013.01); *H04W 76/11* (2018.02)

(58) Field of Classification Search
CPC ..... H04W 76/15; H04W 76/11; H04W 28/22; H04W 36/08
See application file for complete search history.

(56) References Cited

U.S. PATENT DOCUMENTS

| 2014/0254476 A1 | 9/2014 | Blankenship et al. |
| 2016/0080578 A1 | 3/2016 | Stenfelt et al. |
| 2017/0339609 A1 | 11/2017 | Youn et al. |
| 2018/0115921 A1 | 4/2018 | Chen et al. |

(Continued)

FOREIGN PATENT DOCUMENTS

| CN | 104185227 A | 12/2014 |
| CN | 106664597 A | 5/2017 |
| EP | 3582543 A1 | 12/2019 |

OTHER PUBLICATIONS

Huawei et al., "TS 23.501: Enforcement of Session AMBR", SA WG2 Meeting #120, S2-171867, Busan, South Korea, Mar. 27-31, 2017, 5 pages.

(Continued)

*Primary Examiner* — Justin Y Lee
(74) *Attorney, Agent, or Firm* — Slater Matsil, LLP

(57) ABSTRACT

Embodiments of this application provide a rate adjustment method, an apparatus, and a system. The method may include the following steps: A mobility management network element determines access information indicating whether a terminal uses NR for access, and determines first APN-AMBR information based on the access information, where the first APN-AMBR information is used to control a data transmission rate.

20 Claims, 11 Drawing Sheets

(56) References Cited

U.S. PATENT DOCUMENTS

2020/0059817 A1\* 2/2020 Baek .................... H04W 28/04

OTHER PUBLICATIONS

Nokia et al., "On split bearers and directly routed bearers in tight LTE-NR interworking", 3GPP TSG-RAN WG2 Meeting #95, R2-164786, Gothenburg, Sweden, Aug. 22-26, 2016, 3 pages.

3GPP TS 23.501 V15.2.0 (Jun. 2018), 3rd Generation Partnership Project; Technical Specification Group Services and System Aspects; System Architecture for the 5G System; Stage 2 (Release 15), 16 pages.

Huawei, "Further discussions on AMBR", 3GPP TSG-RAN WG3 meeting #100, R3-183139, Busan, Korea, May 21-25, 2018, 2 pages.

Huawei, "Further discussions on QoS info transfer over F1", 3GPP TSG-RAN WG3 NR Ad-Hoc#1801, R3-180343, Sophia Antipolis, France, Jan. 22-26, 2018, 5 pages.

\* cited by examiner

RATE ADJUSTMENT METHOD, APPARATUS, AND SYSTEM

CROSS-REFERENCE TO RELATED APPLICATIONS

This application is a continuation of International Application No. PCT/CN2019/088233, filed on May 24, 2019, which claims priority to Chinese Patent Application No. 201810669446.1, filed Jun. 26, 2018. The disclosures of the aforementioned applications are hereby incorporated by reference in their entireties.

TECHNICAL FIELD

Embodiments of this application relate to the field of communications technologies, and specifically, to a rate adjustment method, apparatus, and system.

BACKGROUND

That a terminal (for example, user equipment (UE)) supports a dual connectivity (DC) technology means that a terminal device can connect to two base stations at a same moment. One of the two base stations is referred to as a master base station or a first base station, and the other of the two base stations is referred to as a secondary base station or a second base station. In a network architecture of a 5th generation mobile communications system (5GS), a terminal device can simultaneously connect to two base stations. One of the two base stations is a 5G base station (gNB), and the other of the two base stations is an evolved NodeB (eNodeB or eNB). DC in the 5GS may be referred to as multi-radio access technology dual connectivity (MR-DC).

In a 5GS MR-DC scenario, if UE uses a new air interface (NR) to access a gNB for data transmission, a theoretical highest rate can reach 4T bits per second (bps); and if the UE uses only an evolved universal terrestrial radio access network (E-UTRAN), the theoretical highest rate can only reach 10 Gbps. If the UE suddenly does not use NR for gNB access, this results in data packet loss because a data transmission rate of the UE is set to be comparatively high. Conversely, if the UE suddenly uses NR for gNB access, this affects data transmission efficiency because the data transmission rate of the UE is comparatively low, and therefore, the data transmission rate of the UE needs to be increased.

Currently, in the 5GS MR-DC scenario, when the UE suddenly uses NR for gNB access or suddenly does not use NR for gNB access, the data transmission rate cannot be adjusted. Therefore, how to adjust the data transmission rate is an urgent technical problem to be resolved.

SUMMARY

Embodiments of this application provide a communication method and apparatus, so as to resolve a problem in the current technology that a data transmission rate cannot be adjusted, so that the data transmission rate can be adaptively adjusted, thereby both avoiding data packet loss and ensuring data transmission efficiency.

A first aspect of the embodiments of this application provides a rate adjustment method, including:

A mobility management network element determines access information indicating whether a terminal uses NR for access.

The mobility management network element determines first access point name-aggregate maximum bit rate (APN-AMBR) information based on the access information.

The method provided in the first aspect of this application is applied to a 5GS MR-DC scenario. When the terminal suddenly uses NR for access or suddenly does not use NR for access, the mobility management network element determines the first APN-AMBR information based on whether the terminal uses NR for access. The mobility management network element may notify a user plane network element of the first APN-AMBR information, so that the user plane network element adjusts a data transmission rate of the terminal on the user plane network element based on the first APN-AMBR information, so as to implement adaptive adjustment of the data transmission rate of the terminal on the user plane network element based on the first APN-AMBR information, thereby avoiding data packet loss and also ensuring data transmission efficiency.

The access information is used to indicate whether the terminal uses NR for gNB access. If the terminal uses NR for access, the terminal can use NR system for data transmission; or if the terminal does not use NR for access, the terminal cannot use NR system for data transmission.

APN-AMBR information may include an APN-AMBR parameter and a value of the APN-AMBR parameter, and is used to control a data transmission rate. An APN-AMBR is used to restrict an aggregate maximum bit rate (AMBR) of all non-guaranteed bit rate (non-GBR) bearers of a terminal at a specific access point name (APN). APN-AMBR rate control may be performed on a terminal. That is, the terminal may adjust a data transmission rate based on the value of the APN-AMBR parameter, for example, control a maximum value of the data transmission rate on the terminal not to exceed the value of the APN-AMBR parameter. Alternatively, rate control may be performed on a packet data network element. That is, the packet data network element may adjust a data transmission rate based on the value of the APN-AMBR parameter.

In a possible implementation, the mobility management network element may determine, based on first indication information sent by a master network node, the access information indicating whether the terminal uses NR for access. To be specific, the mobility management network element receives a first message from the master network node, where the first message carries the first indication information, and the first indication information is used to indicate whether the terminal uses NR for access, so that the mobility management network element determines, based on the first indication information, the access information indicating whether the terminal uses NR for access, and the mobility management network element determines the first APN-AMBR information based on the access information.

The first indication information may use a radio access technology (RAT) type for indication.

After receiving a detection request sent by the mobility management network element, the master network node may detect whether the terminal uses NR for access, and notify the mobility management network element of a detection result by using the first indication information, so that the mobility management network element can learn of whether the terminal uses NR for access.

When a detection event subscribed to by the mobility management network element succeeds, the master network node may detect whether the terminal uses NR for access, and notify the mobility management network element of a detection result by using the first indication information, so that the mobility management network element can learn of whether the terminal uses NR for access.

Alternatively, the master network node may proactively detect whether the terminal uses NR for access, and notify the mobility management network element of a detection result by using the first indication information, so that the mobility management network element can learn of whether the terminal uses NR for access.

The master network node is one of two network nodes to which the terminal is dual-connected. The master network node is mainly used to allocate resources and provide data transmission for the two network nodes in a 5GS MR-DC scenario. The other of the two network nodes to which the terminal is dual-connected may be referred to as a secondary network node. The secondary network node is mainly used to provide data transmission for the terminal in the 5GS MR-DC scenario. Alternatively, the master network node may be referred to as a first network node, and the secondary network node may be referred to as a second network node.

In a possible implementation, the mobility management network element may determine, based on second indication information, a location of the terminal, third indication information, and first configuration information, the access information indicating whether the terminal uses NR for access. The second indication information and the location of the terminal are sent by the master network node to the mobility management network element. The second indication information is used to indicate a dual-connectivity capability of the master network node, and the location of the terminal may be a tracking area to which the terminal belongs. The third indication information is sent by the terminal to the mobility management network element. The third indication information is used to indicate whether the terminal has a dual-connectivity capability, that is, whether the terminal can simultaneously connect to two network nodes.

When the master network node has the dual-connectivity capability and the terminal has the dual-connectivity capability, if the terminal enters a tracking area supporting dual connectivity from a tracking area not supporting dual connectivity, in this case, the tracking area to which the location of the terminal belongs supports dual connectivity, and the mobility management network element may determine access information indicating that the terminal uses NR for access; or if the terminal enters a tracking area not supporting dual connectivity from a tracking area supporting dual connectivity, in this case, the tracking area to which the location of the terminal belongs does not support dual connectivity, and the mobility management network element may determine access information indicating that the terminal does not use NR for access.

In a possible implementation, the mobility management network element may determine the first APN-AMBR information based on the access information and second configuration information. The second configuration information includes APN-AMBR information that exists when NR is used for access or APN-AMBR information that exists when NR is not used for access. For example, if the access information indicates that the terminal uses NR for access, the mobility management network element may select, from the second configuration information, the APN-AMBR information that exists when NR is used for access, and use the APN-AMBR information as the first APN-AMBR information.

Not using NR for access may be that the terminal uses an E-UTRAN for data transmission, and does not use NR for access to a network node. Using NR for access may be that the terminal uses NR for data transmission.

In a possible implementation, the first message further includes second APN-AMBR information. The second APN-AMBR information is APN-AMBR information suggested by the master network node. The master network node may determine the suggested APN-AMBR information based on actual usage of the master network node. The mobility management network element may determine the first APN-AMBR information based on the access information and the second APN-AMBR information, that is, determine the first APN-AMBR information with reference to the access information and the second APN-AMBR information.

In a possible implementation, after determining the first APN-AMBR information, the mobility management network element may send the first APN-AMBR information to the terminal. The first APN-AMBR information is used by the terminal to control the data transmission rate based on the first APN-AMBR information. That is, the terminal adjusts the data transmission rate on the terminal based on the first APN-AMBR information, to avoid that the data transmission rate on the terminal exceeds the value of the first APN-AMBR parameter, or the terminal increases the data transmission rate on the terminal based on the first APN-AMBR information, to ensure data transmission efficiency.

In a possible implementation, after determining the first APN-AMBR information, the mobility management network element may determine first UE-AMBR information through calculation based on the first APN-AMBR information, and send the first UE-AMBR information to the master network node, so that the master network node can control the data transmission rate of the terminal based on the first UE-AMBR information.

UE-AMBR information may include a UE-AMBR parameter and a value of the UE-AMBR parameter, and is used to control a data transmission rate. A UE-AMBR is used to restrict an aggregate maximum bit rate of all non-GBR bearers of a terminal. UE-AMBR rate control may be performed on the master network node. That is, the master network node adjusts the data transmission rate based on the value of the UE-AMBR parameter, for example, controls a maximum value of the data transmission rate of the terminal on the master network node not to exceed the value of the UE-AMBR parameter.

In a possible implementation, the mobility management network element sends a first bearer management request to a serving network element, where the first bearer management request includes the access information. After receiving the first bearer management request, the serving network element sends a second bearer management request to a packet data network element, where the second bearer management request includes the access information. After receiving the second bearer management request, the packet data network element determines third APN-AMBR information based on the access information, and controls a data transmission rate of the packet data network element based on the third APN-AMBR information. The packet data network element sends a second bearer management response to the serving network element, where the second bearer management response is used to respond to the second bearer management request, and the second bearer management response includes the third APN-AMBR information. After receiving the second bearer management response, the serving network element sends a first bearer management response to the mobility management network element, where the first bearer management response includes the third APN-AMBR information.

After receiving the third APN-AMBR information, the mobility management network element may send the third APN-AMBR information to the terminal. The third APN-AMBR information is used by the terminal to control the data transmission rate based on the third APN-AMBR information. That is, the terminal adjusts the data transmission rate on the terminal based on the third APN-AMBR information, to avoid that the data transmission rate on the terminal exceeds the value of the third APN-AMBR parameter, or the terminal increases the data transmission rate on the terminal based on the third APN-AMBR information, to ensure data transmission efficiency.

After receiving the third APN-AMBR information, the mobility management network element may determine third UE-AMBR information through calculation based on the third APN-AMBR information, and send the third UE-AMBR information to the master network node, so that the master network node can control the data transmission rate of the terminal based on the third UE-AMBR information.

In a possible implementation, the first bearer management request and the second bearer management request further include the second APN-AMBR information. The second APN-AMBR information is APN-AMBR information suggested by the master network node. The second APN-AMBR information and the access information are used by the packet data network element to determine the third APN-AMBR information.

In a possible implementation, the first bearer management request and the second bearer management request further include the first APN-AMBR information. The packet data network element may determine the third APN-AMBR information based on the access information on a basis of the first APN-AMBR information. Alternatively, the packet data network element determines the third APN-AMBR information based on the access information and the second APN-AMBR information on a basis of the first APN-AMBR information.

In a possible implementation, the mobility management network element sends a first bearer management request to a serving network element, where the first bearer management request includes the access information. After receiving the first bearer management request, the serving network element sends a second bearer management request to a packet data network element, where the second bearer management request includes the access information. After receiving the second bearer management request, the packet data network element triggers an internet protocol-connectivity access network (IP-CAN) session modification or establishment procedure, and sends an IP-CAN session management request to a policy rule network element, where the IP-CAN session management request includes the access information. The policy rule network element determines third APN-AMBR information based on the access information, and sends an IP-CAN session management response to the packet data network element, where the IP-CAN session management response includes the third APN-AMBR information. After receiving the third APN-AMBR information, the packet data network element sends a second bearer management response to the serving network element, and controls a data transmission rate on the packet data network element based on the third APN-AMBR information, where the second bearer management response is used to respond to the second bearer management request, and the second bearer management response includes the third APN-AMBR information. After receiving the second bearer management response, the serving network element sends a first bearer management response to the mobility management network element, where the first bearer management response includes the third APN-AMBR information.

After receiving the third APN-AMBR information, the mobility management network element may send the third APN-AMBR information to the terminal. The third APN-AMBR information is used by the terminal to control the data transmission rate based on the third APN-AMBR information. That is, the terminal adjusts the data transmission rate on the terminal based on the third APN-AMBR information, to avoid that the data transmission rate on the terminal exceeds the value of the third APN-AMBR parameter, or the terminal increases the data transmission rate on the terminal based on the third APN-AMBR information, to ensure data transmission efficiency.

After receiving the third APN-AMBR information, the mobility management network element may determine third UE-AMBR information through calculation based on the third APN-AMBR information, and send the third UE-AMBR information to the master network node, so that the master network node can control the data transmission rate of the terminal based on the third UE-AMBR information.

A bearer management request may be a bearer establishment request, or may be a bearer modification request, depending on a specific case, and the same applies to a bearer management response. When the first bearer management request is a first bearer establishment request, the second bearer management request is a second bearer establishment request, the second bearer management response is a second bearer establishment response, and the first bearer management response is a first bearer establishment response.

In a possible implementation, the first bearer management request, the second bearer management request, and the IP-CAN session management request further include the second APN-AMBR information. The second APN-AMBR information is APN-AMBR information suggested by the master network node. The second APN-AMBR information and the access information are used by the policy rule network element to determine the third APN-AMBR information based on the second APN-AMBR information and the access information.

In a possible implementation, the first bearer management request, the second bearer management request, and the IP-CAN session management request further include the first APN-AMBR information. The policy rule network element determines the third APN-AMBR information based on the access information on a basis of the first APN-AMBR information. Alternatively, the policy rule network element determines the third APN-AMBR information based on the access information and the second APN-AMBR information on a basis of the first APN-AMBR information.

In a possible implementation, the mobility management network element determines fourth indication information based on a quality of service class identifier (quality of service class identifier, QCI) of a bearer, and sends the fourth indication information to the master network node. The fourth indication information is used to indicate whether the master network node allocates a resource of the master network node to the bearer or whether the master network node allocates a resource of the secondary network node to the bearer, so that the master network node determines whether to allocate the resource of the master network node or the resource of the secondary network node to the bearer.

In a possible implementation, the first bearer management response and the second bearer management response further include fourth indication information. After receiving the fourth indication information, the mobility management network element sends the fourth indication information to the master network node. The fourth indication information is used to indicate whether the master network node allocates a resource of the master network node to a bearer or whether the master network node allocates a resource of the secondary network node to the bearer, so that the master network node determines whether to allocate the resource of the master network node or the resource of the secondary network node to the bearer. The fourth indication information may be determined by the packet data network element based on a QCI of the bearer, or may be obtained by the packet data network element from the policy rule network element. The policy rule network element may determine the fourth indication information based on the QCI of the bearer.

A second aspect of the embodiments of this application provides a mobility management network element. The mobility management network element has functions of implementing the method provided in the first aspect. The functions may be implemented by hardware, or may be implemented by hardware by executing corresponding software. The hardware or software includes one or more units corresponding to the foregoing functions.

In a possible implementation, the mobility management network element includes a first processing unit and a second processing unit. The first processing unit is configured to determine access information indicating whether a terminal uses NR for access. The second processing unit is configured to: determine first APN-AMBR information based on the access information.

In a possible implementation, the mobility management network element includes a processor, a transceiver, and a memory. The transceiver is configured to receive and send information. The memory stores a computer-executable instruction. The processor is connected to the memory and the transceiver by using a bus, and the processor executes the computer-executable instruction stored in the memory, so that the mobility management network element performs the following operations: determining access information indicating whether a terminal uses NR for access; and determining first APN-AMBR information based on the access information.

Based on a same inventive concept, for problem resolving principles and beneficial effects of the mobility management network element, refer to the method described in the first aspect and beneficial effects brought by the method. Therefore, for implementation of the mobility management network element, refer to implementation of the method, and repeated parts are not described in detail again.

A third aspect of the embodiments of this application provides a computer-readable storage medium. The computer-readable storage medium stores an instruction. When the instruction runs on a computer, the computer is enabled to perform the method described in the foregoing first aspect.

A fourth aspect of the embodiments of this application provides a computer program product including an instruction. When the instruction runs on a computer, the computer is enabled to perform the method described in the foregoing first aspect.

A fifth aspect of the embodiments of this application provides a rate adjustment method, including:

A session management network element determines access information indicating whether a terminal uses NR for access.

The session management network element determines first session-aggregate maximum bit rate session-AMBR information based on the access information.

The method provided in the fifth aspect of this application is applied to a 5GS MR-DC scenario. When the terminal suddenly uses NR for access or suddenly does not use NR for access, the session management network element determines the first session-AMBR information based on whether the terminal uses NR for access. The session management network element may notify the terminal and/or a user plane network element of the first session-AMBR information, so that the terminal and/or the user plane network element adjust/adjusts a data transmission rate based on the first session-AMBR information, so as to implement adaptive adjustment of the data transmission rate based on the first session-AMBR information, thereby avoiding data packet loss and also ensuring data transmission efficiency.

Session-AMBR information may include a session-AMBR parameter and a value of the session-AMBR parameter, and is used to control a data transmission rate. A session-AMBR is used to restrict an aggregate maximum bit rate of all non-GBR quality of service (QoS) flows of a terminal on a specific session. Session-AMBR rate control may be performed on a terminal. That is, the terminal may adjust a data transmission rate based on the value of the session-AMBR parameter, for example, control a maximum value of the data transmission rate on the terminal not to exceed the value of the session-AMBR parameter. Alternatively, rate control may be performed on a user plane network element. That is, the user plane network element may adjust a data transmission rate based on the value of the session-AMBR parameter.

In a possible implementation, the session management network element may determine, based on first indication information sent by an access management network element, the access information indicating whether the terminal uses NR for access. To be specific, the session management network element receives a first message from the access management network element, where the first message includes the first indication information, and the first indication information is used to indicate whether the terminal uses NR for access, so that the session management network element determines, based on the first indication information, the access information indicating whether the terminal uses NR for access, and the mobility management network element determines the first session-AMBR information based on the access information.

The first indication information may use a RAT type for indication.

The access management network element may receive the first indication information from a master network node, and send the first indication information to the session management network element by using the first message, so that the session management network element learns of the first indication information.

The access management network element may determine, based on second indication information, a location of the terminal, third indication information, and first configuration information, the first indication information indicating whether the terminal uses NR for access. The second indication information and the location of the terminal are sent by the master network node to the access management network element. The second indication information is used to indicate a dual-connectivity capability of the master network node, and the location of the terminal may be a tracking area to which the terminal belongs. The third indication information is sent by the terminal to the access management network element. The third indication information is used to indicate whether the terminal has a dual-connectivity capability, that is, whether the terminal can simultaneously connect to two network nodes.

When the master network node has the dual-connectivity capability and the terminal has the dual-connectivity capability, if the terminal enters a tracking area supporting dual connectivity from a tracking area not supporting dual connectivity, in this case, the tracking area to which the location of the terminal belongs supports dual connectivity, and the access management network element may determine first indication information indicating that the terminal uses NR for access; or if the terminal enters a tracking area not supporting dual connectivity from a tracking area supporting dual connectivity, in this case, the tracking area to which the location of the terminal belongs does not support dual connectivity, and the access management network element may determine first indication information indicating that the terminal does not use NR for access. After determining the first indication information indicating whether the terminal uses NR for access, the access management network element sends the first indication information to the session management network element by using the first message, so that the session management network element learns of the first indication information.

In a possible implementation, the session management network element may determine the first session-AMBR information based on the access information and second configuration information. The second configuration information includes session-AMBR information that exists when NR is used for access or session-AMBR information that exists when NR is not used for access.

In a possible implementation, the first message further includes second session-AMBR information. The second session-AMBR information is session-AMBR information suggested by the master network node. The master network node may determine the suggested session-AMBR information based on actual usage of the master network node. The session management network element may determine the first session-AMBR information based on the access information and the second session-AMBR information, that is, determine the first session-AMBR information with reference to the access information and the second session-AMBR information.

In a possible implementation, after determining the first session-AMBR information, the session management network element may send the first session-AMBR information to the user plane network element. The first session-AMBR information is used by the user plane network element to control the data transmission rate based on the first session-AMBR information. That is, the user plane network element adjusts the data transmission rate of the terminal on the user plane network element based on the first session-AMBR information, to avoid that the data transmission rate of the terminal on the user plane network element exceeds the value of the first session-AMBR parameter, or the user plane network element increases the data transmission rate of the terminal on the user plane network element based on the first session-AMBR information, to ensure data transmission efficiency.

In a possible implementation, after determining the first session-AMBR information, the session management network element may send the first session-AMBR information to the terminal by using the access management network element. That is, the session management network element sends the first session-AMBR information to the access management network element, the access management network element sends the first session-AMBR information to the terminal, and the terminal updates session-AMBR information in the terminal based on the first session-AMBR information.

If a value of the session-AMBR parameter in session-AMBR information previously sent by the session management network element to the terminal by using the access management network element is comparatively large, for example, greater than a value of the first session-AMBR parameter in the currently determined first session-AMBR information, the session management network element may not send the currently determined first session-AMBR information to the terminal, and the terminal may not adjust the data transmission rate.

The session management network element may also send the first session-AMBR information to the master network node via the access management network element. That is, the session management network element sends the first session-AMBR information to the access management network element; the access management network element sends the first session-AMBR information to the master network node; and the master network node updates session-AMBR information in the master network node based on the first session-AMBR information, and determines first UE-AMBR information through calculation based on the first session-AMBR information, so that the master network node can control the data transmission rate based on the first UE-AMBR information.

UE-AMBR information may include a UE-AMBR parameter and a value of the UE-AMBR parameter, and is used to control a data transmission rate. A UE-AMBR is used to restrict an aggregate maximum bit rate of all non-GBR QoS flows of a terminal. UE-AMBR rate control may be performed on the master network node. That is, the master network node adjusts the data transmission rate of the terminal based on the value of the UE-AMBR parameter, for example, controls a maximum value of the data transmission rate of the terminal on the master network node not to exceed the value of the UE-AMBR parameter.

In a possible implementation, the session management network element sends a policy update request to a policy management network element, where the policy update request includes the access information. The policy management network element determines third session-AMBR information based on the access information, and sends a policy update response to the session management network element, where the policy update response includes the third session-AMBR information.

The policy update request may further include the first session-AMBR information. The policy management network element determines the third session-AMBR information based on the access information on a basis of the first session-AMBR information. That is, the policy management network element adjusts the first session-AMBR information based on the access information on a basis of the first session-AMBR information, to obtain the third session-AMBR information.

After receiving the third session-AMBR information, the session management network element sends the third session-AMBR information to a user plane network element. The third session-AMBR information is used by the user plane network element to control a data transmission rate based on the third session-AMBR information.

After receiving the third session-AMBR information, the session management network element may send the third session-AMBR information to the terminal by using the access management network element. That is, the session management network element sends the third session-AMBR information to the access management network element, the access management network element sends the third session-AMBR information to the terminal, and the terminal updates session-AMBR information in the terminal based on the third session-AMBR information.

After receiving the third session-AMBR information, the session management network element may also send the third session-AMBR information to the master network node via the access management network element. That is, the session management network element sends the third session-AMBR information to the access management network element; the access management network element sends the third session-AMBR information to the master network node; and the master network node updates session-AMBR information in the master network node based on the third session-AMBR information, and may determine third UE-AMBR information through calculation based on the third session-AMBR information, so that the master network node can control the data transmission rate based on the third UE-AMBR information.

In a possible implementation, the policy update request further includes the second session-AMBR information. The second session-AMBR information is session-AMBR information suggested by the master network node. The master network node may determine the suggested session-AMBR information based on actual usage of the master network node. The second session-AMBR information and the access information are used by the policy management network element to determine the third session-AMBR information. That is, the policy management network element may determine the third session-AMBR information with reference to the access information and the second session-AMBR information.

In a possible implementation, the policy update request further includes the first session-AMBR information, so that the policy management network element determines the third session-AMBR information based on the access information on a basis of the first session-AMBR information, or determines the third session-AMBR information based on the access information and the second session-AMBR information on a basis of the first session-AMBR information.

In a possible implementation, the session management network element determines fourth indication information based on a 5G QoS indicator (5G QoS indicator, 5QI). The session management network element may further send the fourth indication information to the master network node via the access management network element. The fourth indication information is used to indicate whether the master network node allocates a resource of the master network node to a quality of service flow of a session or whether the master network node allocates a resource of a secondary network node to a quality of service flow of a session, that is, indicate whether the master network node allocates the resource of the master network node or the resource of the secondary network node to the quality of service flow of the session, so that the master network node determines whether to allocate the resource of the master network node or the resource of the secondary network node to the quality of service flow of the session.

In a possible implementation, the policy update response further includes fourth indication information. The fourth indication information is determined by the policy management network element based on a 5QI. The session management network element may further send the fourth indication information to the master network node via the access management network element. The fourth indication information is used to indicate whether the master network node allocates a resource of the master network node to a quality of service flow of a session or whether the master network node allocates a resource of a secondary network node to a quality of service flow of a session, that is, indicate whether the master network node allocates the resource of the master network node or the resource of the secondary network node to the quality of service flow of the session.

A sixth aspect of the embodiments of this application provides a session management network element. The session management network element has functions of implementing the method provided in the fifth aspect. The functions may be implemented by hardware, or may be implemented by hardware by executing corresponding software. The hardware or software includes one or more units corresponding to the foregoing functions.

In a possible implementation, the session management network element includes a first processing unit and a second processing unit. The first processing unit is configured to determine access information indicating whether a terminal uses NR for access. The second processing unit is configured to: determine first session-AMBR information based on the access information.

In a possible implementation, the session management network element includes a processor, a transceiver, and a memory. The transceiver is configured to receive and send information. The memory stores a computer-executable instruction. The processor is connected to the memory and the transceiver by using a bus, and the processor executes the computer-executable instruction stored in the memory, so that the session management network element performs the following operations: determining access information indicating whether a terminal uses NR for access; and determining first session-AMBR information based on the access information.

Based on a same inventive concept, for problem resolving principles and beneficial effects of the session management network element, refer to the method described in the fifth aspect and beneficial effects brought by the method. Therefore, for implementation of the session management network element, refer to implementation of the method, and repeated parts are not described in detail again.

A seventh aspect of the embodiments of this application provides a computer-readable storage medium. The computer-readable storage medium stores an instruction. When the instruction runs on a computer, the computer is enabled to perform the method described in the foregoing fifth aspect.

An eighth aspect of the embodiments of this application provides a computer program product including an instruction. When the instruction runs on a computer, the computer is enabled to perform the method described in the foregoing fifth aspect.

A ninth aspect of the embodiments of this application provides a rate adjustment method, including:

A mobility management network element determines access information indicating whether a terminal uses NR for access.

The mobility management network element generates first APN-AMBR information and second APN-AMBR information based on the access information, where the first APN-AMBR information is APN-AMBR information that exists when NR is used for access, and the second APN-AMBR is APN-AMBR information that exists when NR is not used for access.

The method provided in the ninth aspect of this application is applied to a 5GS MR-DC scenario. When the terminal suddenly uses NR for access or suddenly does not use NR for access, the mobility management network element generates the first APN-AMBR information and the second APN-AMBR information based on whether the terminal uses NR for access, so that the terminal and a master network node can select a piece of AMBR information for use based on whether the terminal uses NR for access, and a packet data network element determines, according to an indication from the mobility management network element, an AMBR to be used.

In a possible implementation, after generating the first APN-AMBR information and the second APN-AMBR information, the mobility management network element obtains first UE-AMBR information and second UE-AMBR information through calculation based on the first APN-AMBR information and the second APN-AMBR information. The first UE-AMBR information is UE-AMBR information that exists when NR is used for access, and the second UE-AMBR information is UE-AMBR information that exists when NR is not used for access. The mobility management network element sends the first UE-AMBR information and the second UE-AMBR information to the master network node, so that the master network node selects one from the first UE-AMBR information and the second UE-AMBR information based on whether the terminal uses NR for access, and controls a data transmission rate based on the selected UE-AMBR information.

In a possible implementation, the mobility management network element sends a first bearer establishment request to a serving network element, where the first bearer request includes the first APN-AMBR information, the second APN-AMBR information, and the access information. The serving network element sends a second bearer establishment request to the packet data network element, where the second bearer establishment request includes the first APN-AMBR information, the second APN-AMBR information, and the access information. The packet data network element adjusts the first APN-AMBR information and the second APN-AMBR information based on the access information, to obtain third APN-AMBR information and fourth APN-AMBR information. The packet data network sends a second bearer establishment response to the serving network element, where the second bearer establishment response includes the third APN-AMBR information and the fourth APN-AMBR information. The serving network element sends a first bearer establishment response to the mobility management network element, where the first bearer establishment response includes the third APN-AMBR information and the fourth APN-AMBR information. The mobility management network element obtains third UE-AMBR information and fourth UE-AMBR information through calculation based on the third APN-AMBR information and the fourth APN-AMBR information, where the third UE-AMBR information is UE-AMBR information that exists when NR is used for access, and the fourth UE-AMBR information is UE-AMBR information that exists when NR is not used for access. The mobility management network element sends the third UE-AMBR information and the fourth UE-AMBR information to the master network node, so that the master network node selects one from the third UE-AMBR information and the fourth UE-AMBR information based on whether the terminal uses NR for access, and controls the data transmission rate based on the selected UE-AMBR information.

In a possible implementation, the first bearer establishment request and the second bearer establishment request further include fifth APN-AMBR information. The fifth APN-AMBR information is APN-AMBR information suggested by the master network node. The fifth APN-AMBR information and the access information are used to determine the third APN-AMBR information and the fourth APN-AMBR information, for example, used by the packet data network element to adjust the first APN-AMBR information and the second APN-AMBR information based on the fifth APN-AMBR information and the access information, to obtain the third APN-AMBR information and the fourth APN-AMBR information.

A tenth aspect of the embodiments of this application provides a mobility management network element. The mobility management network element has functions of implementing the method provided in the ninth aspect. The functions may be implemented by hardware, or may be implemented by hardware by executing corresponding software. The hardware or software includes one or more units corresponding to the foregoing functions.

In a possible implementation, the mobility management network element includes a first processing unit and a second processing unit. The first processing unit is configured to determine access information indicating whether a terminal uses NR for access. The second processing unit is configured to: generate first APN-AMBR information and second APN-AMBR information based on the access information.

In a possible implementation, the mobility management network element includes a processor, a transceiver, and a memory. The transceiver is configured to receive and send information. The memory stores a computer-executable instruction. The processor is connected to the memory and the transceiver by using a bus, and the processor executes the computer-executable instruction stored in the memory, so that the mobility management network element performs the following operations: determining access information indicating whether a terminal uses NR for access; and generating first APN-AMBR information and second APN-AMBR information based on the access information.

Based on a same inventive concept, for problem resolving principles and beneficial effects of the mobility management network element, refer to the method described in the ninth aspect and beneficial effects brought by the method. Therefore, for implementation of the mobility management network element, refer to implementation of the method, and repeated parts are not described in detail again.

An eleventh aspect of the embodiments of this application provides a computer-readable storage medium. The computer-readable storage medium stores an instruction. When the instruction runs on a computer, the computer is enabled to perform the method described in the foregoing ninth aspect.

A twelfth aspect of the embodiments of this application provides a computer program product including an instruction. When the instruction runs on a computer, the computer is enabled to perform the method described in the foregoing ninth aspect.

A thirteenth aspect of the embodiments of this application provides a rate adjustment method, including the following.

A session management network element determines access information indicating whether a terminal uses NR for access.

The session management network element generates first session-AMBR information and second session-AMBR information based on the access information, where the first session-AMBR information is session-AMBR information that exists when NR is used for access, and the second session-AMBR information is session-AMBR information that exists when NR is not used for access.

The method provided in the thirteenth aspect of this application is applied to a 5GS MR-DC scenario. When the terminal suddenly uses NR for access or suddenly does not use NR for access, the session management network element generates the first session-AMBR information and the second session-AMBR information based on whether the terminal uses NR for access, so that the terminal and a master network node can select a piece of AMBR information for use based on whether the terminal uses NR for access, and a user plane network element determines, according to an indication from the mobility management network element, an AMBR to be used.

In a possible implementation, after generating the first session-AMBR information and the second session-AMBR information, the session management network element sends a session management request to the user plane network element. The session management request includes the first session-AMBR information, the second session-AMBR information, and indication information, so that the user plane network element selects one from the first session-AMBR information and the second session-AMBR information based on the indication information to control a data transmission rate.

In a possible implementation, the session management network element sends a first message to the master network node by using an access management network element. The first message includes the first session-AMBR information and the second session-AMBR information. The first session-AMBR information and the second session-AMBR information are used by the master network node to: calculate a UE-AMBR and a second UE-AMBR, select one from the first UE-AMBR information and the second UE-AMBR information based on whether the terminal uses NR for access, and control the data transmission rate based on the selected UE-AMBR information.

In a possible implementation, the session management network element sends a policy update request to a policy management network element, where the policy update request includes the first session-AMBR information, the second session-AMBR information, and the access information, and the access information is used by the policy management network element to determine third session-AMBR information and fourth session-AMBR information. The session management network element receives a policy update response from the policy management network element, where the policy update response includes the third session-AMBR information and the fourth session-AMBR information. The session management network element sends a session management request to the user plane network element, where the session management request includes the third session-AMBR information, the fourth session-AMBR information, and indication information, so that the user plane network element selects one from the third session-AMBR information and the fourth session-AMBR information based on the indication information to control the data transmission rate.

In a possible implementation, the policy update request further includes fifth session-AMBR information. The fifth session-AMBR information is session-AMBR information suggested by the master network node. The fifth session-AMBR information and the access information are used by the policy management network element to determine the third session-AMBR information and the fourth session-AMBR information.

In a possible implementation, the session management network element sends a first message to the master network node by using an access management network element. The first message includes the third session-AMBR information and the fourth session-AMBR information. The third session-AMBR information and the fourth session-AMBR information are used by the master network node to: calculate a third UE-AMBR and a fourth UE-AMBR, select one from the third UE-AMBR information and the fourth UE-AMBR information based on whether the terminal uses NR for access, and control the data transmission rate based on the selected UE-AMBR information.

A fourteenth aspect of the embodiments of this application provides a session management network element. The session management network element has functions of implementing the method provided in the thirteenth aspect. The functions may be implemented by hardware, or may be implemented by hardware by executing corresponding software. The hardware or software includes one or more units corresponding to the foregoing functions.

In a possible implementation, the session management network element includes a first processing unit and a second processing unit. The first processing unit is configured to determine access information indicating whether a terminal uses NR for access. The second processing unit is configured to: generate first session-AMBR information and second session-AMBR information based on the access information.

In a possible implementation, the session management network element includes a processor, a transceiver, and a memory. The transceiver is configured to receive and send information. The memory stores a computer-executable instruction. The processor is connected to the memory and the transceiver by using a bus, and the processor executes the computer-executable instruction stored in the memory, so that the session management network element performs the following operations: determining access information indicating whether a terminal uses NR for access; and generating first session-AMBR information and first session-AMBR information based on the access information.

Based on a same inventive concept, for problem resolving principles and beneficial effects of the session management network element, refer to the method described in the thirteenth aspect and beneficial effects brought by the method. Therefore, for implementation of the session management network element, refer to implementation of the method, and repeated parts are not described in detail again.

A fifteenth aspect of the embodiments of this application provides a computer-readable storage medium. The computer-readable storage medium stores an instruction. When the instruction runs on a computer, the computer is enabled to perform the method described in the foregoing thirteenth aspect.

A sixteenth aspect of the embodiments of this application provides a computer program product including an instruction. When the instruction runs on a computer, the computer is enabled to perform the method described in the foregoing thirteenth aspect.

A seventeenth aspect of the embodiments of this application provides a rate adjustment system, including a mobility management network element and a master network node.

The master network node is configured to send a first message to the mobility management network element.

The mobility management network element is configured to: receive the first message, where the first message includes first indication information, and the first indication information is used to indicate whether the terminal uses NR for access; determine, based on the first indication information, access information indicating whether the terminal uses NR for access; and determine first APN-AMBR information based on the access information.

The rate adjustment system provided in the seventeenth aspect of this application is applied to a 5GS MR-DC scenario. The master network node sends the first indication information to the mobility management network element, to indicate whether the terminal uses NR for access, and the mobility management network element determines the first APN-AMBR information based on whether the terminal uses NR for access. The mobility management network element may notify a user plane network element of the first APN-AMBR information, so that the user plane network element adjusts a data transmission rate of the terminal on the user plane network element based on the first APN-AMBR information, so as to implement adaptive adjustment of the data transmission rate of the terminal on the user plane network element based on the first APN-AMBR information, thereby avoiding data packet loss and also ensuring data transmission efficiency.

In a possible implementation, the rate adjustment system further includes a serving network element and a packet data network element.

The serving network element receives a first bearer management request from the mobility management network element, where the first bearer management request includes the access information, and sends a second bearer management request to the packet data network element, where the second bearer management request includes the access information. After receiving the second bearer management request, the packet data network element determines third APN-AMBR information based on the access information, and controls a data transmission rate of the packet data network element based on the third APN-AMBR information. The packet data network element sends a second bearer management response to the serving network element, where the second bearer management response is used to respond to the second bearer management request, and the second bearer management response includes the third APN-AMBR information. After receiving the second bearer management response, the serving network element sends a first bearer management response to the mobility management network element, where the first bearer management response includes the third APN-AMBR information.

The mobility management network element may notify the user plane network element of the third APN-AMBR information, so that the user plane network element adjusts the data transmission rate of the terminal on the user plane network element based on the third APN-AMBR information, so as to implement adaptive adjustment of the data transmission rate of the terminal on the user plane network element based on the third APN-AMBR information.

In a possible implementation, the rate adjustment system further includes a serving network element, a packet data network element, and a policy rule network element.

The serving network element receives a first bearer management request from the mobility management network element, where the first bearer management request includes the access information, and sends a second bearer management request to the packet data network element, where the second bearer management request includes the access information. After receiving the second bearer management request, the packet data network element triggers an IP-CAN session modification or establishment procedure, and sends an IP-CAN session management request to the policy rule network element, where the IP-CAN session management request includes the access information. The policy rule network element determines third APN-AMBR information based on the access information, and sends an IP-CAN session management response to the packet data network element, where the IP-CAN session management response includes the third APN-AMBR information. After receiving the third APN-AMBR information, the packet data network element sends a second bearer management response to the serving network element, and controls a data transmission rate on the packet data network element based on the third APN-AMBR information, where the second bearer management response is used to respond to the second bearer management request, and the second bearer management response includes the third APN-AMBR information. After receiving the second bearer management response, the serving network element sends a first bearer management response to the mobility management network element, where the first bearer management response includes the third APN-AMBR information.

The mobility management network element may notify the user plane network element of the third APN-AMBR information, so that the user plane network element adjusts the data transmission rate of the terminal on the user plane network element based on the third APN-AMBR information, so as to implement adaptive adjustment of the data transmission rate of the terminal on the user plane network element based on the third APN-AMBR information.

An eighteenth aspect of the embodiments of this application provides a rate adjustment system, including an access management network element and a session management network element.

The access management network element is configured to obtain first indication information, where the first indication information is used to indicate whether a terminal uses NR for access.

The session management network element is configured to: receive a first message from the access management network element, where the first message includes the first indication information; and determine first session-AMBR information based on the first indication information.

The rate adjustment system provided in the eighteenth aspect of this application is applied to a 5GS MR-DC scenario. The access management network element obtains the first indication information indicating whether the terminal uses NR for access, and sends the first indication information to the session management network element. The session management network element determines the first session-AMBR information based on the first indication information. The session management network element may notify the terminal and/or a user plane network element of the first session-AMBR information, so that the terminal and/or the user plane network element adjust/adjusts a data transmission rate based on the first session-AMBR information, so as to implement adaptive adjustment of the data transmission rate based on the first session-AMBR information, thereby avoiding data packet loss and also ensuring data transmission efficiency.

In a possible implementation, the rate adjustment system further includes a master network node.

The master network node sends the first indication information to the access management network element, so that the access management network element obtains the first indication information, and sends the first indication information to the session management network element by using the first message, and the session management network element learns of the first indication information.

In a possible implementation, the access management network element may determine, based on second indication information, a location of the terminal, third indication information, and first configuration information, the first indication information indicating whether the terminal uses NR for access. The second indication information and the location of the terminal are sent by the master network node to the access management network element. The second indication information is used to indicate a dual-connectivity capability of the master network node, and the location of the terminal may be a tracking area to which the terminal belongs. The third indication information is sent by the terminal to the access management network element. The third indication information is used to indicate whether the terminal has a dual-connectivity capability.

In a possible implementation, the rate adjustment system further includes a policy management network element.

The policy management network element receives a policy update request from the session management network element, where the policy update request includes access information; and determines third session-AMBR information based on the access information, and sends a policy update response to the session management network element, where the policy update response includes the third session-AMBR information.

The session management network element may notify the terminal and/or the user plane network element of the third session-AMBR information, so that the terminal and/or the user plane network element adjust/adjusts a data transmission rate based on the third session-AMBR information, so as to implement adaptive adjustment of the data transmission rate based on the third session-AMBR information, thereby avoiding data packet loss and also ensuring data transmission efficiency.

BRIEF DESCRIPTION OF THE DRAWINGS

To describe the technical solutions in the embodiments of this application or in the background more clearly, the following describes the accompanying drawings for describing the embodiments of this application or the background.

DETAILED DESCRIPTION OF ILLUSTRATIVE EMBODIMENTS

The following describes the technical solutions in the embodiments of this application with reference to the accompanying drawings in the embodiments of this application. In a description of this application, unless otherwise specified, "/" indicates that associated objects are in an "or" relationship. For example, A/B may represent A or B. In this application, "and/or" is merely an association relationship describing associated objects, and indicates that three relationships may exist. For example, A and/or B may represent the following three cases: Only A exists, both A and B exist, and only B exists, where A and B may be singular or plural. In addition, in the descriptions of this application, "a plurality of" means two or more than two unless otherwise specified. "at least one item (one) of the following" or a similar expression thereof represents any combination of these items, including a single item or any combination of a plurality of items. For example, "at least one of a, b, or c" may represent a, b, c, a-b, a-c, b-c, or a-b-c, where a, b, and c may be singular or plural. In addition, to clearly describe the technical solutions in the embodiments of this application, words such as "first" and "second" are used in the embodiments of this application to distinguish between same or similar items that have basically same functions and roles. A person skilled in the art may understand that the words such as "first" and "second" do not limit a quantity and an execution order, and the words such as "first" and "second" do not limit a definite difference either.

In addition, a network architecture and a service scenario described in the embodiments of this application are intended to describe the technical solutions in the embodiments of this application more clearly, and do not constitute a limitation on the technical solutions provided in the embodiments of this application. A person of ordinary skill in the art may know that: With the evolution of the network architecture and the emergence of new service scenarios, the technical solutions provided in the embodiments of this application are also applicable to similar technical problems.

Figure 1:
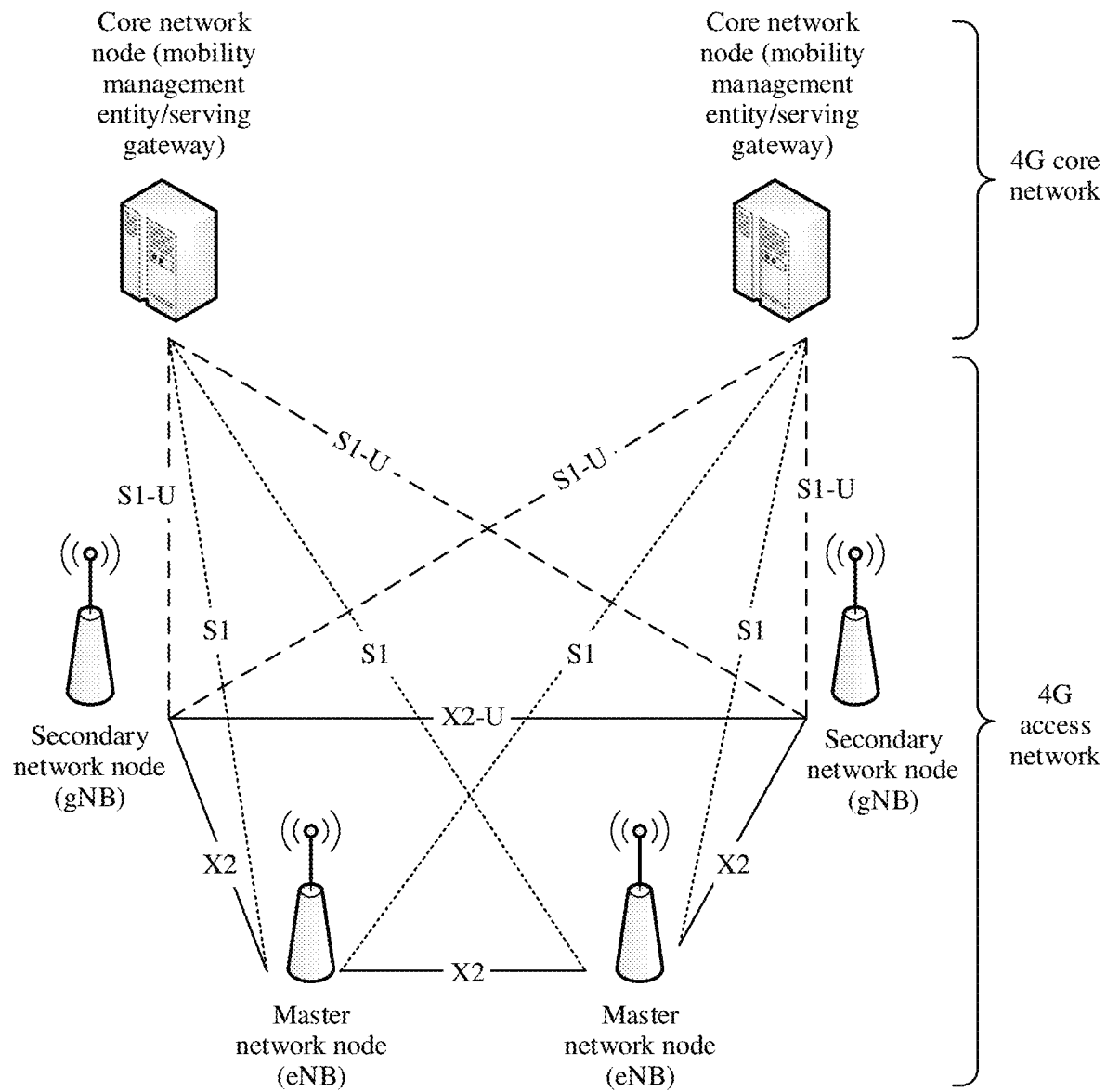
FIG. 1 is a schematic diagram of an MR-DC network architecture in a 5GS.
Figure 2:
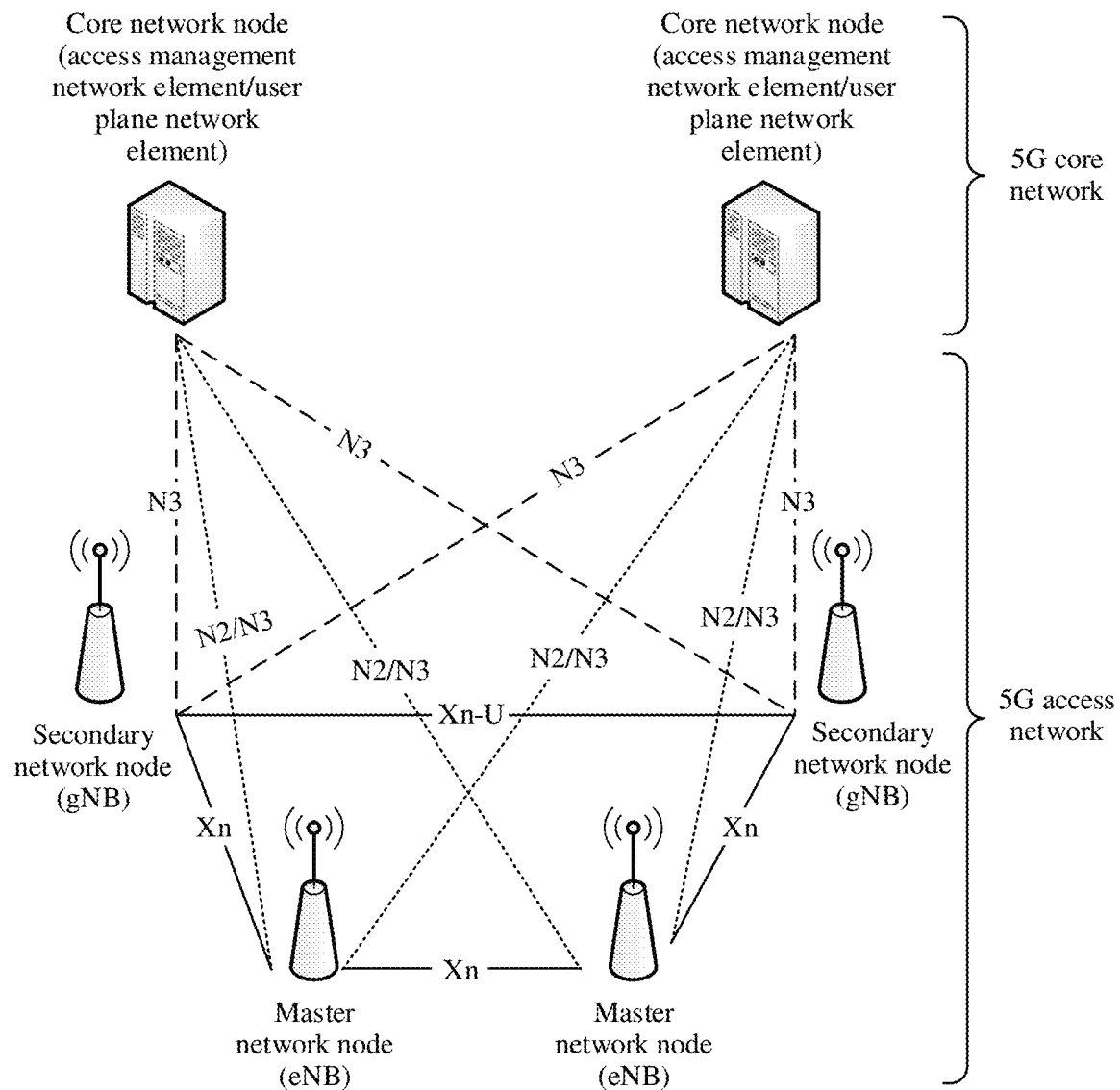
FIG. 2 is a schematic diagram of another MR-DC network architecture in a 5GS.
Figure 3:
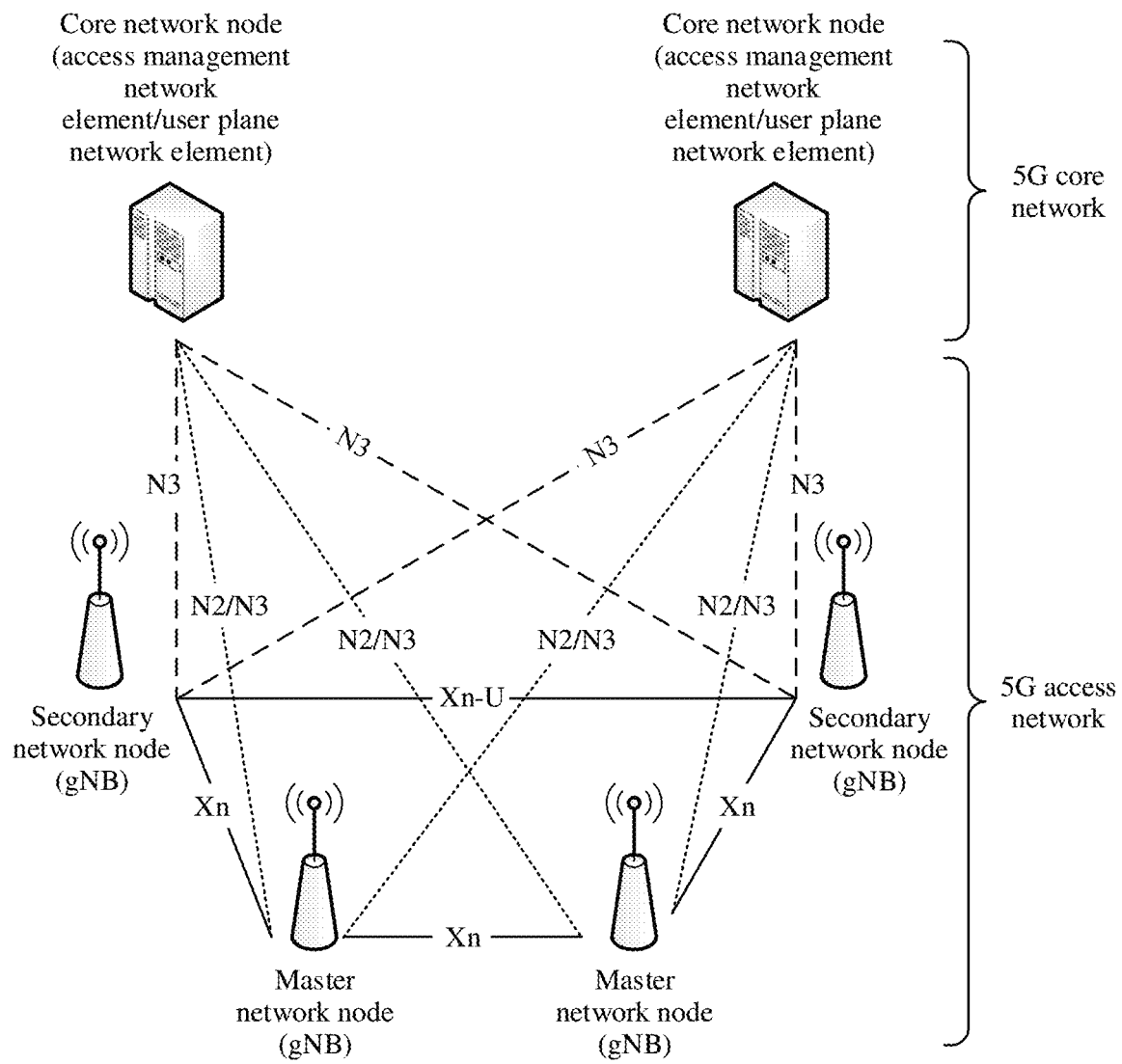
FIG. 3 is a schematic diagram of still another MR-DC network architecture in a 5GS.

In a 5GS, three MR-DC network architectures exist, as shown in FIG. 1 to FIG. 3.

FIG. 1 is a schematic diagram of an MR-DC network architecture in a 5GS. The network architecture is an E-UTRAN-NR dual connectivity (EN-DC) network architecture. In this network architecture, a master network node is a master base station, and is an eNB; a secondary network node is a secondary base station, and is a gNB; and a core network node includes a control plane network element, where the control plane network element may be a mobility management entity (MME) network element. There is an S1-MME signaling plane interface between the master network node and the MME network element, there is an X2-C signaling plane interface and an X2-U user plane interface between the master network node and the secondary network node, there is an S1-U user plane interface between the master network node and a serving network element, and there is an S1-U user plane interface between the secondary network node and the serving network element. The serving network element may be a serving gateway (SGW) network element.

FIG. 2 is a schematic diagram of another MR-DC network architecture in a 5GS. The network architecture is a next generation radio access network (NG-RAN) E-UTRAN-NR dual connectivity (NGEN-DC) network architecture. In this network architecture, a master network node is a master base station, and is an eNB; a secondary network node is a secondary base station, and is a gNB; and a core network node includes a control plane network element, where the control plane network element may be an access and mobility management function (AMF) network element. There is an N2 signaling plane interface between the master network node and the AMF network element, there is an Xn-C signaling plane interface and an Xn-U user plane interface between the master network node and the secondary network node, there is an N3 user plane interface between the master network node and a user plane network element, and there is an N3 user plane interface between the secondary network node and the user plane network element. The user plane network element may be a user plane function (user plane function, UPF) network element.

FIG. 3 is a schematic diagram of still another MR-DC network architecture in a 5GS. The network architecture is NR E-UTRAN dual connectivity (NE-DC) network architecture. In this network architecture, a master network node is a master base station, and is a gNB; a secondary network node is a secondary base station, and is an eNB; and a core network node includes a control plane network element, where the control plane network element may be an AMF network element. There is an N2 signaling plane interface between the master network node and the AMF network element, there is an Xn-C signaling plane interface and an Xn-U user plane interface between the master network node and the secondary network node, there is an N3 user plane interface between the master network node and a user plane network element, and there is an N3 user plane interface between the secondary network node and the user plane network element. The user plane network element may be a UPF network element.

It should be noted that names of the interfaces between the network elements in FIG. 1 to FIG. 3 are merely examples, and in specific implementation, the interface names may be other names. This is not specifically limited in the embodiments of this application.

In a process of establishing a bearer or a session, a master network node is responsible for allocating a radio access network (RAN) side resource to the bearer or the session. The master network node may allocate a resource of the master network node to the bearer or the session, or may allocate a resource of a secondary network node to the bearer or the session. After establishment of the bearer or the session is completed, a core network control plane network element does not know whether a resource provider of the bearer or the session on a RAN side is the master network node or the secondary network node.

If a control plane of 5GS MR-DC is on a 4G core network, parameters controlling a data transmission rate of UE include an APN-AMBR and a UE-AMBR. APN-AMBR rate control is performed on a packet data network gateway (PGW) network element and the UE, and the APN-AMBR is used to restrict an aggregate maximum bit rate of all non-GBR bearers of the UE at a specific APN. UE-AMBR rate control is performed on a RAN, and the UE-AMBR is used to restrict an aggregate maximum bit rate of all non-GBR bearers of the UE.

If a control plane of 5GS MR-DC is on a 5G core network, parameters controlling a data transmission rate of UE include a session-AMBR and a UE-AMBR. Session-AMBR rate control is performed on a UPF network element and the UE, and the session-AMBR is used to restrict an aggregate maximum bit rate of all non-GBR QoS flows of the UE on a specific session. UE-AMBR rate control is performed on a RAN, and the UE-AMBR is used to restrict an aggregate maximum bit rate of all non-GBR QoS flows of the UE.

If transmission rate requirements of a guaranteed bit rate (GBR) bearer and a GBR QoS flow are not met, the RAN releases resources of the GBR bearer and the GBR QoS flow. If a rate suddenly drops and is lower than a GBR/guaranteed flow bit rate (GFBR), or if a rate suddenly rises and is higher than a maximum bit rate (MBR)/maximum flow bit rate (MFBR), the GBR bearer and the GBR QoS flow are consequently released.

Currently, in a 5GS MR-DC scenario, when UE suddenly uses NR for gNB access or suddenly does not use NR for gNB access, a data transmission rate cannot be adjusted. In view of this, the embodiments of this application provide a rate adjustment method, apparatus, and system, so as to adaptively adjust a data transmission rate, thereby both avoiding data packet loss and ensuring data transmission efficiency.

Figure 4:
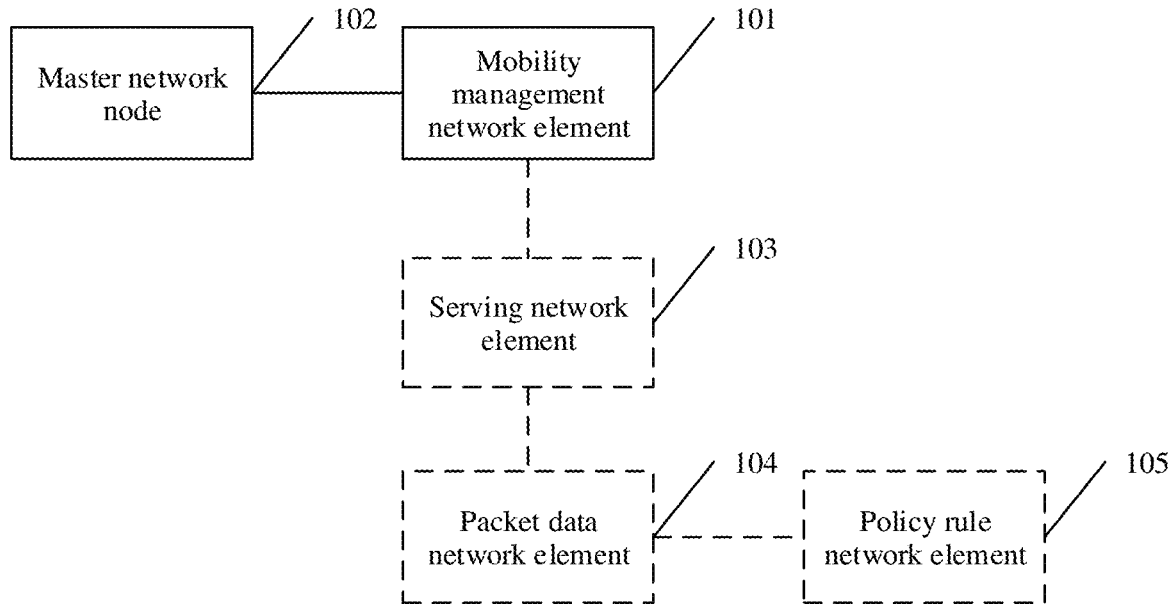
FIG. 4 is a schematic diagram of a network architecture of a rate adjustment system according to an embodiment of this application.
Figure 5:
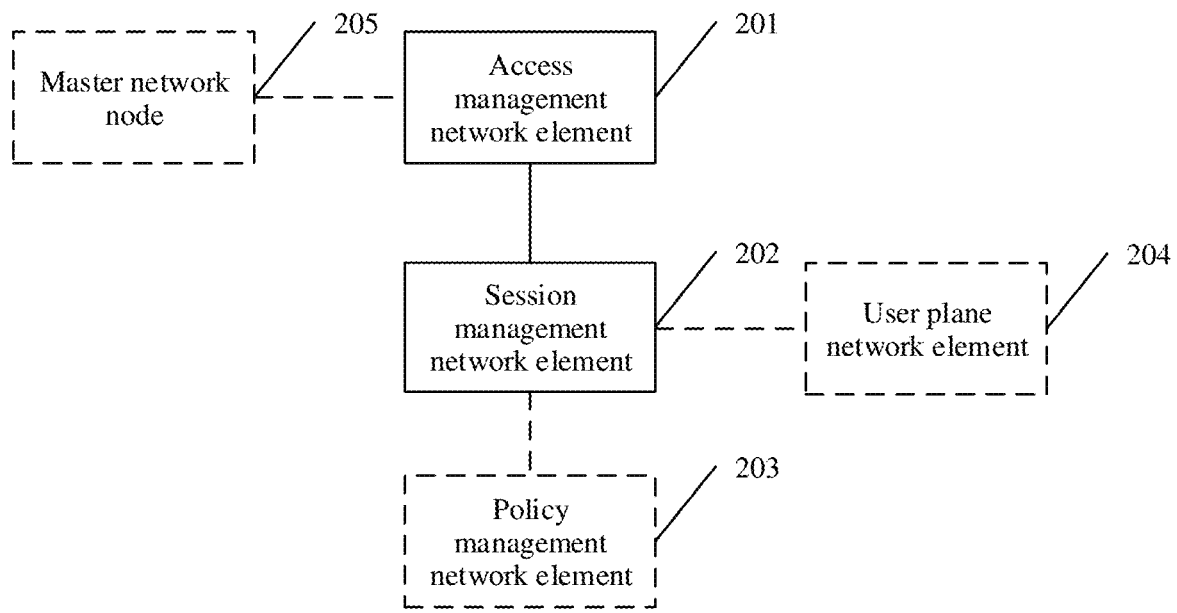
FIG. 5 is a schematic diagram of a network architecture of another rate adjustment system according to an embodiment of this application.

FIG. 4 and FIG. 5 are schematic diagrams of network architectures of two rate adjustment systems according to embodiments of this application. The rate adjustment system shown in FIG. 4 may implement adjustment of a data transmission rate of a bearer, and the rate adjustment system shown in FIG. 5 may implement adjustment of a data transmission rate of a session.

FIG. 4 is a schematic diagram of a network architecture of a rate adjustment system according to an embodiment of this application. The rate adjustment system may include a mobility management network element 101 and a master network node 102.

The mobility management network element 101 may be an MME network element, and the MME network element is responsible for access control and mobility management. The master network node 102 is responsible for allocating a RAN side resource to a bearer. The RAN side resource may be from the master network node 102, or may be from a secondary network node.

Specifically, in this embodiment of this application, the mobility management network element 101 is configured to: determine access information indicating whether a terminal uses NR for access, and determine first APN-AMBR information based on the access information.

The mobility management network element 101 may be configured to receive first indication information from the master network node 102. The first indication information is used to indicate whether the terminal uses NR for access, so that the mobility management network element 101 can determine, based on the first indication information, the access information indicating whether the terminal uses NR for use. Specifically, in this embodiment of this application, the master network node 102 is configured to send the first indication information to the mobility management network element.

The mobility management network element 101 may be configured to autonomously determine, based on some information, the access information indicating whether the terminal uses NR for access. For example, the mobility management network element 101 determines, based on second indication information, a location of the terminal, third indication information, and first configuration information, whether the terminal uses NR for access. The second indication information and the location of the terminal are sent by the master network node 102 to the mobility management network element 101. The second indication information is used to indicate a dual-connectivity capability of the master network node, and the location of the terminal may be a tracking area to which the terminal belongs. The third indication information is sent by the terminal to the mobility management network element 101, and is used to indicate a dual-connectivity capability of the terminal. The first configuration information includes a tracking area identifier and a dual-connectivity capability of a tracking area corresponding to the tracking area identifier, and may be configured by an operator. Specifically, in this embodiment of this application, the master network node 102 is further configured to send the second indication information and the location of the terminal to the mobility management network element 101.

The mobility management network element 101 may be configured to determine the first APN-AMBR information based on the access information and second APN-AMBR information. The second APN-AMBR information is APN-AMBR information suggested by the master network node 102. The master network node 102 sends the second APN-AMBR information to the mobility management network element 101. The master network node 102 may add the second APN-AMBR information and the first indication information to a same message, and send the message to the mobility management network element 101, for example, add the second APN-AMBR information and the first indication information to a first message.

The mobility management network element 101 is further configured to send the first APN-AMBR information to the terminal, so that the terminal controls a data transmission rate based on the first APN-AMBR information.

In a possible implementation, the rate adjustment system shown in FIG. 4 further includes a serving network element 103 and a packet data network element 104. The serving network element 103 may be an SGW network element. Under control of the MME network element, the SGW network element routes and forwards a data packet, and forwards received data to a specified PGW network element. The packet data network element may be a PGW network element. The PGW network element is responsible for session and bearer management.

Specifically, in this embodiment of this application, the serving network element 103 is configured to: receive a first bearer management request from the mobility management network element 101, where the first bearer management request includes the access information; and send a second bearer management request to the packet data network element 104, where the second bearer management request includes the access information. After receiving the second bearer management request, the packet data network element 104 determines third APN-AMBR information based on first access information, where the third APN-AMBR information is used by the packet data network element 104 to control a data transmission rate; and sends a second bearer management response to the serving network element 103, where the second bearer management response includes the third APN-AMBR information. After receiving the second bearer management response, the serving network element 103 sends a first bearer management response to the mobility management network element 101, where the first bearer management response includes the third APN-AMBR information. After receiving the first bearer management response, the mobility management network element 101 may send the third APN-AMBR information to the terminal, so that the terminal controls the data transmission rate based on the third APN-AMBR information.

The first bearer management request may be a first bearer establishment request or a first bearer modification request, and the same applies to the second bearer management request, the first bearer management response, and the second bearer management response. It should be noted that when the first bearer management request is a first bearer establishment request, the second bearer management request is a second bearer establishment request, the first bearer management response is a first bearer establishment response, and the second bearer management response is a second bearer establishment response.

The first bearer management request and the second bearer management request further include the second APN-AMBR information. The packet data network element 104 is further configured to determine the third APN-AMBR information based on the second APN-AMBR information and the access information.

In a possible implementation, the rate adjustment system shown in FIG. 4 further includes a serving network element 103, a packet data network element 104, and a policy rule network element 105. The serving network element 103 may be an SGW network element. The SGW network element routes and forwards a data packet under control of the MME network element, and forwards received data to a specified PGW network element. The packet data network element may be a PGW network element. The PGW network element is responsible for session and bearer management. The policy rule network element 105 may be a policy and charging rules function (PCRF) network element, and includes a policy control decision function and a flow-based charging control function.

Specifically, in this embodiment of this application, the serving network element 103 is configured to: receive a first bearer management request from the mobility management network element 101, where the first bearer management request includes the access information; and send a second bearer management request to the packet data network element 104, where the second bearer management request includes the access information. After receiving the second bearer management request, the packet data network element 104 sends an IP-CAN session management request to the policy rule network element 105, where the IP-CAN session management request includes the access information. The policy rule network element 105 determines third APN-AMBR information based on first access information, where the third APN-AMBR information is used by the packet data network element 104 to control a data transmission rate; and sends an IP-CAN session management response to the packet data network element 104, where the IP-CAN session management response includes the third APN-AMBR information. After receiving the IP-CAN session management response, the packet data network element 104 sends a second bearer management response to the serving network element 103, where the second bearer management response includes the third APN-AMBR information. After receiving the second bearer management response, the serving network element 103 sends a first bearer management response to the mobility management network element 101, where the first bearer management response includes the third APN-AMBR information. After receiving the first bearer management response, the mobility management network element 101 may send the third APN-AMBR information to the terminal, so that the terminal controls the data transmission rate based on the third APN-AMBR information.

The IP-CAN session management request may be an IP-CAN session establishment request or an IP-CAN session modification request, and the same applies to the IP-CAN session management response. It should be noted that when the IP-CAN session management request is an IP-CAN session establishment request, the IP-CAN session management response may be an IP-CAN session establishment response.

The first bearer management request, the second bearer management request, and the IP-CAN session management request further include the second APN-AMBR information. The policy rule network element 105 is further configured to determine the third APN-AMBR information based on the second APN-AMBR information and the access information.

It should be noted that the master network node, the mobility management network element, the serving network element, the packet data network element, the policy rule network element, and the like in FIG. 4 are merely names, and the names do not constitute a limitation on the devices. In a 5G network and another future network, network elements or entities corresponding to the master network node, the mobility management network element, the serving network element, the packet data network element, and the policy rule network element may alternatively have other names. This is not specifically limited in this embodiment of this application.

FIG. 5 is a schematic diagram of a network architecture of another rate adjustment system according to an embodiment of this application. The rate adjustment system may include an access management network element 201 and a session management network element 202.

The access management network element 201 may be an AMF network element, and is configured to perform mobility and access management. The session management network element 202 may be a session management function (SMF) network element, and is configured to manage a session of a terminal, including session establishment, session modification, and session release.

Specifically, in this embodiment of this application, the access management network element 201 is configured to: obtain first indication information, where the first indication information is used to indicate whether the terminal uses NR for access; and send a first message to the session management network element 202, where the first message carries the first indication information. After receiving the first message, the session management network element 202 determines first session-AMBR information based on the first indication information.

In a possible implementation, the rate adjustment system shown in FIG. 5 further includes a master network node 205, which is responsible for allocating a RAN side resource to a bearer. The RAN side resource may be from the master network node 102, or may be from a secondary network node.

Specifically, in this embodiment of this application, the master network node 205 is configured to send the first indication information to the access management network element 201, so that the access management network element 201 can obtain the first indication information.

The master network node 205 is further configured to send second indication information and a location of the terminal to the access management network element 201, so that the access management network element 201 can determine the first indication information based on the second indication information, the location of the terminal, third indication information, and first configuration information. The second indication information is used to indicate a dual-connectivity capability of the master network node, and the location of the terminal may be a tracking area to which the terminal belongs. The third indication information is sent by the terminal to the access management network element 201, and is used to indicate a dual-connectivity capability of the terminal. The first configuration information includes a tracking area identifier and a dual-connectivity capability of a tracking area corresponding to the tracking area identifier, and may be configured by an operator.

The master network node 205 is further configured to send second session-AMBR information to the access management network element 201. The second session-AMBR information is session-AMBR information suggested by the master network node. After receiving the second session-AMBR information, the access management network element 201 may send the second session-AMBR information to the session management network element 202. The access management network element 201 may add the second session-AMBR information and the first indication information to a same message, and send the message to the session management network element 202. For example, the first message further includes the second session-AMBR information.

In a possible implementation, the rate adjustment system shown in FIG. 5 further includes a user plane network element 204. The user plane network element 204 may be a UPF network element, and is configured to route/forward a data packet.

Specifically, in this embodiment of this application, the user plane network element 204 receives the first session-AMBR information from the session management network element 202, and controls a data transmission rate based on the first session-AMBR information.

In a possible implementation, the rate adjustment system shown in FIG. 5 further includes a policy management network element 203. The policy management network element 203 may be a policy control function (PCF) network element, and is configured to provide a policy rule to a control plane for execution.

Specifically, in this embodiment of this application, the policy management network element 203 receives a policy update request from the session management network element 202, where the policy update request includes the first indication information and the first session-AMBR information; determines third session-AMBR information based on the first indication information and the first session-AMBR information; and sends a policy update response to the session management network element 202, where the policy update response includes the third session-AMBR information. After receiving the third session-AMBR information, the session management network element 202 may send the third session-AMBR information to a user plane network element, so that the user plane network element controls a data transmission rate based on the third session-AMBR information.

It should be noted that the master network node, the access management network element, the session management network element, the policy management network element, the user plane network element, and the like in FIG. 5 are merely names, and the names do not constitute a limitation on the devices. In a 5G network and another future network, network elements or entities corresponding to the master network node, the access management network element, the session management network element, the policy management network element, and the user plane network element may alternatively have other names. This is not specifically limited in this embodiment of this application.

Optionally, the rate adjustment system shown in FIG. 4 or FIG. 5 may be applied to a current 5G network, or may be applied to another future network. This is not specifically limited in this embodiment of this application.

Optionally, the terminal in the embodiments of this application may include various handheld devices with a wireless communication function, various vehicle-mounted devices with a wireless communication function, various wearable devices with a wireless communication function, various computing devices with a wireless communication function, or another processing device connected to a wireless modem; and may further include a subscriber unit, a cellular phone, a smartphone, a wireless data card, a personal digital assistant (PDA) computer, a tablet computer, a wireless modem, a handheld device, a laptop computer, a cordless phone or a wireless local loop (WLL) station, a machine type communication (MTC) terminal, UE, a mobile station (MS), a terminal device, a relay user device, or the like. The relay user device may be, for example, a 5G residential gateway (RG). For ease of description, the devices mentioned above are collectively referred to as a terminal in this application.

Optionally, the mobility management network element in FIG. 4, the access management network element in FIG. 5, or the session management network element in FIG. 5 in the embodiments of this application may be implemented by one device, or may be jointly implemented by a plurality of devices, or may be a functional module in a device. This is not specifically limited in the embodiments of this application. It may be understood that the foregoing function may be a network element in a hardware device, or may be a software function running on dedicated hardware, or a virtualization function instantiated on a platform (for example, a cloud platform).

Figure 6:
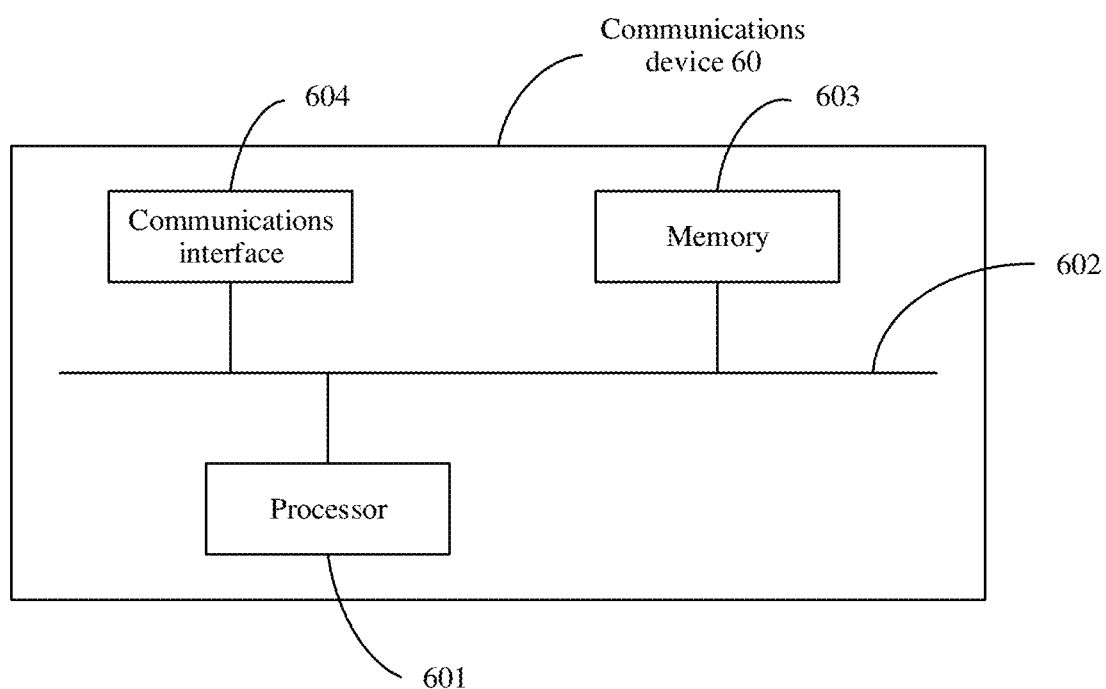
FIG. 6 is a schematic diagram of a hardware structure of a communications device according to an embodiment of this application.

For example, the mobility management network element in FIG. 4, the access management network element in FIG. 5, or the session management network element in FIG. 5 in the embodiments of this application may be implemented by a communications device in FIG. 6. FIG. 6 is a schematic diagram of a hardware structure of a communications device according to an embodiment of this application. The communications device 6o includes at least one processor 601, a communications line 602, a memory 603, and at least one communications interface 604.

The processor 601 may be a general-purpose central processing unit (CPU), a microprocessor, an application-specific integrated circuit (ASIC), or one or more integrated circuits configured to control program execution of the solutions in this application.

The communications line 602 may include a path for transferring information between the foregoing components.

The communications interface 604 uses an apparatus such as any transceiver, and is configured to communicate with another device or communications network, for example, an ethernet, a radio access network (RAN), or a wireless local area network (WLAN).

The memory 603 may be a read-only memory (ROM) or another type of static storage device capable of storing static information and an instruction, a random access memory (RAM) or another type of dynamic storage device capable of storing information and an instruction, or may be an electrically erasable programmable read-only memory (EEPROM), a compact disc read-only memory (CD-ROM), or other compact disc storage or optical disc storage (including a compressed optical disc, a laser disc, an optical disc, a digital universal optical disc, a blue-ray optical disc, and the like), a magnetic disk storage medium or another magnetic storage device, or any other medium capable of carrying or storing expected program code in a form of an instruction or a data structure and capable of being accessed by a computer, but is not limited thereto. The memory may exist independently, and may be connected to the processor through the communications line 602. The memory may be alternatively integrated with the processor.

The memory 603 is configured to store a computer-executable instruction that is used to execute the solutions in this application, and the execution is controlled by the processor 60i. The processor 601 is configured to execute the computer-executable instruction stored in the memory 603, to implement a rate adjustment method provided in the following embodiments of this application.

Optionally, the computer-executable instruction in this embodiment of this application may also be referred to as application program code. This is not specifically limited in this embodiment of this application.

In specific implementation, in an embodiment, the processor 601 may include one or more CPUs.

In specific implementation, in an embodiment, the communications device 60 may include a plurality of processors. Each of these processors may be a single-core processor, or may be a multi-core processor. The processor herein may be one or more devices, circuits, and/or processing cores configured to process data (for example, a computer program instruction).

The communications device 60 may be a general-purpose device or a dedicated device. In specific implementation, the communications device 60 may be a desktop computer, a portable computer, a network server, a personal digital assistant (PDA), a mobile phone, a tablet computer, a wireless terminal device, an embedded device, or a device with a structure similar to that in FIG. 6. A type of the communications device 60 is not limited in this embodiment of this application.

The following specifically describes a rate adjustment method according to the embodiments of this application with reference to FIG. 7 to FIG. 10.

It should be noted that in the following embodiments of this application, a name of a message sent between network elements, a name of each parameter in a message, or the like is merely an example, and another name may be alternatively used in specific implementation. This is not specifically limited in the embodiments of this application. In the embodiments of this application, an example is used for description in which a mobility management network element is an MME network element, a serving network element is an SGW network element, a packet data network element is a PGW network element, a policy rule network element is a PCRF network element, an access management network element is an AMF network element, a session management network element is an SMF network element, a policy management network element is a PCF, and a user plane network element is a UPF network element. A master network node in the embodiments of this application may be an eNB, or may be a gNB. The master network node may be referred to as a master node (MN). In the embodiments of this application, an example is used for description in which the master network node is an MN.

Figure 7:
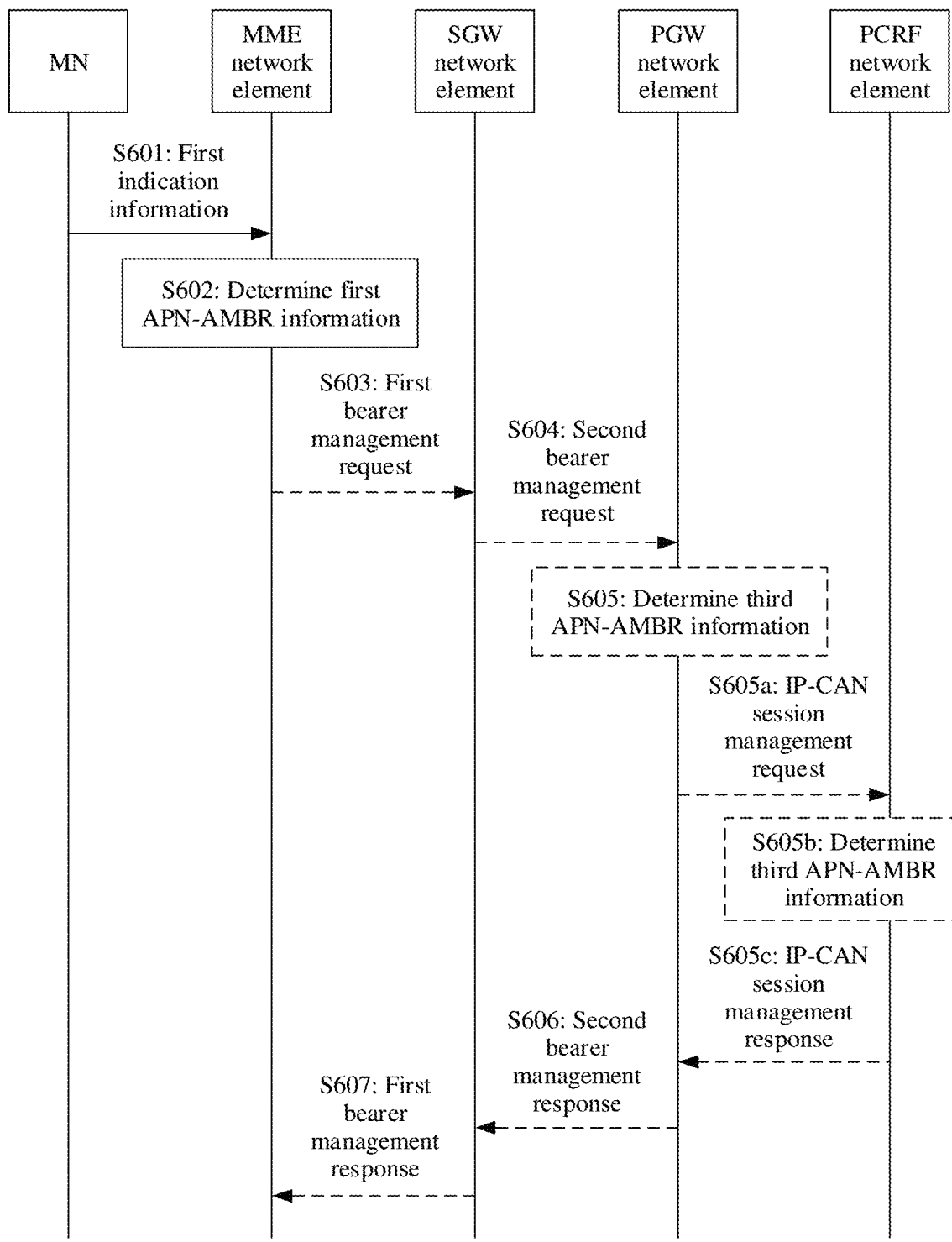
FIG. 7 is a schematic flowchart of a rate adjustment method according to Embodiment 1 of this application.

An example is used in which the rate adjustment system shown in FIG. 4 is applied to the MR-DC network architectures shown in FIG. 1 to FIG. 3. FIG. 7 is a schematic flowchart of a rate adjustment method according to Embodiment 1 of this application. An MME network element in the method may be implemented by the communications device shown in FIG. 6. The method may include but is not limited to the following steps.

Step S601: An MN sends first indication information to the MME network element, and correspondingly, the MME network element receives the first indication information from the MN.

The first indication information may be dual connectivity indication information (DC indication), and is used to indicate whether a terminal uses NR for access. That whether a terminal uses NR for access means that whether the terminal uses NR for gNB access. If the terminal uses NR for access, the terminal can use NR system for data transmission; or if the terminal does not use NR for access, the terminal cannot use NR system for data transmission.

The first indication information may use a RAT type for indication. For example, if the terminal does not use NR for access, the RAT type is E-UTRAN; or if the terminal uses NR for access, the RAT type is NR. Alternatively, the first indication information may use a value of an indicator bit for indication. For example, when the value of the indicator bit is 0, it indicates that the terminal does not use NR for access; or when the value of the indicator bit is 1, it indicates that the terminal uses NR for access. Alternatively, the first indication information may use a bearer identifier and a RAT type for indication, or may use a bearer identifier and a value of an indicator bit for indication. Alternatively, the first indication information may use a session identifier and a RAT type for indication, or may use a session identifier and a value of an indicator bit for indication.

The MN is one of two network nodes to which the terminal is dual-connected. The MN is mainly used to allocate resources and provide data transmission for the two network nodes in a 5GS MR-DC scenario. The other of the two network nodes to which the terminal is dual-connected may be referred to as a secondary network node or a second node (SN). In this embodiment of this application, an example is used in which the secondary network node is an SN.

The MN may send the first indication information to the MME network element by using a first message. That is, the first indication information is carried in the first message. The first message may be a notification message (notify), or may be another type of message. This is not limited in this embodiment of this application.

The first message further includes second APN-AMBR information. The second APN-AMBR information is APN-AMBR information suggested by the MN. The MN may determine the suggested APN-AMBR information based on actual usage of the MN.

In a possible implementation, after receiving a detection request sent by the MME network element, the MN may detect whether the terminal uses NR for access, and notify the MME network element of a detection result by using the first indication information, so that the MME network element can learn of whether the terminal uses NR for access.

In a possible implementation, when a detection event subscribed to by the MME network element succeeds, the MN may detect whether the terminal uses NR for access, and notify the MME network element of a detection result by using the first indication information, so that the MME network element can learn of whether the terminal uses NR for access.

In a possible implementation, alternatively, the MN may proactively detect whether the terminal uses NR for access, and notify the MME network element of a detection result by using the first indication information, so that the MME network element can learn of whether the terminal uses NR for access. In this case, the first indication information may be carried in messages such as an initial terminal message (Initial UE Message), a downlink non-access stratum transport (Uplink NAS Transport) message, a path switch request message, a handover request (HO required) message, a handover notification (HO Notify) message, an EPS radio access bearer modification indication (e-RAB Modification Indication) message, an EPS radio access bearer release indication (e-RAB Release Indication) message, a terminal context modification indication (UE Context Modify Indication) message, or a terminal context release indication (UE Context Release Indication) message.

The MN may determine, in the following several cases, that the terminal does not use NR for access.

Case 1: If the MN is an eNB and the SN is a gNB, signal strength of the gNB is quite weak (for example, lower than a threshold), or the terminal loses a signal connection to the gNB after moving out of an area covered by dual connectivity.

Case 2: If all non-GBR bearers/QoS flows are on an eNB node, for example, non-GBR bearers/QoS flows on a gNB node are handed over to an eNB node or non-GBR bearers/QoS flows on a gNB node are released, the gNB is not used to transmit data.

The MN may determine, in the following several cases, that the terminal uses NR for access.

The terminal establishes a signal connection to a gNB, and hands over a non-GBR bearer/QoS flow to the gNB, or selects the gNB for a newly established bearer/QoS flow, to use the gNB to transmit data.

The MME network element may learn of, based on the first indication information, whether the terminal uses NR for access. Besides this manner, the MME network element may learn of, in another manner, whether the terminal uses NR for access. For example, the MME network element may determine, based on second indication information, a location of the terminal, third indication information, and first configuration information, whether the terminal uses NR for access.

The second indication information and the location of the terminal are sent by the MN to the MME network element. The second indication information is used to indicate a dual-connectivity capability of the MN, that is, whether the MN has the dual-connectivity capability. That the MN has the dual-connectivity capability means that the MN can allocate a resource of the MN to the terminal, and can also allocate a resource of another network node to the terminal. The location of the terminal may be a tracking area to which the terminal belongs.

The third indication information is sent by the terminal to the MME network element. The third indication information is used to indicate whether the terminal has a dual-connectivity capability, that is, whether the terminal can simultaneously connect to two network nodes. The terminal may send the third indication information to the MME network element before step S601, and may send the third indication information to the MME network element by using a non-access stratum (NAS) message, that is, the third indication information is carried in the NAS message. The NAS message may be an attach request, a tracking area update request (TAU Request), a service request, a bearer resource allocation request, a bearer resource modification (Bearer Resource Modification Request), or a packet data network connectivity request (PDN Connectivity Request).

The first configuration information may be configured by an operator, and may include a tracking area identifier and a dual-connectivity capability of a tracking area corresponding to the tracking area identifier. A dual-connectivity capability of a tracking area indicates whether the tracking area supports a terminal in the area simultaneously connecting to two network nodes.

When the MN has the dual-connectivity capability and the terminal has the dual-connectivity capability, if the terminal enters a tracking area supporting dual connectivity from a tracking area not supporting dual connectivity, in this case, the tracking area to which the location of the terminal belongs supports dual connectivity, and the MME network element may determine access information indicating that the terminal uses NR for access; or if the terminal enters a tracking area not supporting dual connectivity from a tracking area supporting dual connectivity, in this case, the tracking area to which the location of the terminal belongs does not support dual connectivity, and the MME network element may determine access information indicating that the terminal does not use NR for access.

When the terminal enters the tracking area supporting dual connectivity from the tracking area not supporting dual connectivity, or enters the tracking area not supporting dual connectivity from the tracking area supporting dual connectivity, a tracking area update (TAU) is triggered, and consequently, the MN is triggered to send the first indication information to the MME network element.

Step S602: The MME network element determines first APN-AMBR information based on the first indication information.

APN-AMBR information may include an APN-AMBR parameter and a value of the APN-AMBR parameter, and is used to control a data transmission rate. An APN-AMBR is used to restrict an aggregate maximum bit rate of all non-GBR bearers of a terminal at a specific APN. APN-AMBR rate control may be performed on a terminal. That is, the terminal may adjust a data transmission rate based on the value of the APN-AMBR parameter, for example, control a maximum value of the data transmission rate on the terminal not to exceed the value of the APN-AMBR parameter. Alternatively, rate control may be performed on a PGW network element. That is, the PGW network element may adjust a data transmission rate based on the value of the APN-AMBR parameter.

In a possible implementation, the MME network element may determine the first APN-AMBR information based on the access information and second configuration information. The second configuration information includes APN-AMBR information that exists when NR is used for access or APN-AMBR information that exists when NR is not used for access. For example, if the access information indicates that the terminal uses NR for access, the MME network element may select, from the second configuration information, the APN-AMBR information that exists when NR is used for access, and use the APN-AMBR information as the first APN-AMBR information.

Not using NR for access may be that the terminal uses an E-UTRAN for data transmission, and does not use NR for access to a network node. Using NR for access may be that the terminal uses NR for data transmission.

In a possible implementation, the first message further includes the second APN-AMBR information. The MME network element may determine the first APN-AMBR information based on the access information and the second APN-AMBR information, that is, determine the first APN-AMBR information with reference to the access information and the second APN-AMBR information.

After determining the first APN-AMBR information, the MME network element may send the first APN-AMBR information to the terminal. The first APN-AMBR information is used by the terminal to control the data transmission rate based on the first APN-AMBR information. That is, the terminal adjusts the data transmission rate on the terminal based on the first APN-AMBR information, to avoid that the data transmission rate on the terminal exceeds the value of the first APN-AMBR parameter, or the terminal increases the data transmission rate on the terminal based on the first APN-AMBR information, to ensure data transmission efficiency.

If a value of the APN-AMBR parameter in APN-AMBR information previously sent by the mobility management network element to the terminal is comparatively large, for example, greater than a value of the first APN-AMBR parameter in the currently determined first APN-AMBR information, the mobility management network element may not send the currently determined first APN-AMBR information to the terminal, and the terminal may not adjust the data transmission rate, thereby reducing system signaling.

After determining the first APN-AMBR information, the MME network element may determine first UE-AMBR information through calculation based on the first APN-AMBR information, and send the first UE-AMBR information to the MN, so that the MN can control the data transmission rate of the terminal based on the first UE-AMBR information.

UE-AMBR information may include a UE-AMBR parameter and a value of the UE-AMBR parameter, and is used to control a data transmission rate. A UE-AMBR is used to restrict an aggregate maximum bit rate of all non-GBR bearers of a terminal. UE-AMBR rate control may be performed on the MN. That is, the MN adjusts the data transmission rate of the terminal based on the value of the UE-AMBR parameter, for example, controls a maximum value of the data transmission rate of the terminal on the MN not to exceed the value of the UE-AMBR parameter.

If a value of the UE-AMBR parameter in UE-AMBR information previously sent by the mobility management network element to the master network node is comparatively large, for example, greater than a value of the first UE-AMBR parameter in the currently determined first UE-AMBR information, the mobility management network element may not send the currently determined first UE-AMBR information to the master network node, and the master network node may not adjust the data transmission rate, thereby reducing system signaling.

In a possible implementation, the following steps may be further included after step S602.

Step S603: The MME network element sends a first bearer management request to an SGW network element, and correspondingly, the SGW network element receives the first bearer management request from the MME network element.

The first bearer management request includes the first indication information, may further include the second APN-AMBR information, may further include the first APN-AMBR information, and may further include the bearer identifier.

Step S604: The SGW network element sends a second bearer management request to the PGW network element, and correspondingly, the PGW network element receives the second bearer management request from the SGW network element.

The second bearer management request includes the first indication information, may further include the second APN-AMBR information, may further include the first APN-AMBR information, and may further include the bearer identifier.

Step S605: The PGW network element determines third APN-AMBR information based on the first indication information.

If the second bearer management request includes the first indication information, the PGW network element may determine the third APN-AMBR information based on the first indication information.

If the second bearer management request includes the first indication information, the PGW network element may alternatively determine the third APN-AMBR information based on the first indication information and the second configuration information. This is the same as that the MME network element determines the first APN-AMBR information based on the first indication information and the second configuration information, and only an execution body is different.

If the second bearer management request includes the first indication information and the second APN-AMBR information, the PGW network element determines the third APN-AMBR information based on the first indication information and the second APN-AMBR information. This is the same as that the MME network element determines the first APN-AMBR information based on the first indication information and the second APN-AMBR information, and only an execution body is different.

If the second bearer management request includes the first indication information, the second APN-AMBR information, and the first APN-AMBR information, the PGW network element may determine the third APN-AMBR information with reference to the first indication information and the second APN-AMBR information on a basis of the first APN-AMBR information.

After determining the third APN-AMBR information, the PGW network element may control a data transmission rate based on the third APN-AMBR information, for example, control a data transmission rate of the terminal on the PGW network element.

If the second bearer management request includes only the first APN-AMBR information, the PGW network element may control a data transmission rate based on the first APN-AMBR information.

Step S606: The PGW network element sends a second bearer management response to the SGW network element, and correspondingly, the SGW network element receives the second bearer management response from the PGW network element.

The second bearer management response is used to respond to the second bearer management request. The second bearer management response includes the third APN-AMBR information, and may further include the bearer identifier.

Step S607: The SGW network element sends a first bearer management response to the MME network element, and correspondingly, the MME network element receives the first bearer management response from the SGW network element.

The first bearer management response is used to respond to the first bearer management request. The first bearer management response includes the third APN-AMBR information, and may further include the bearer identifier.

The first bearer management response and the second bearer management response further include fourth indication information. After receiving the fourth indication information, the MME network element sends the fourth indication information to the MN. The fourth indication information is used to indicate whether the MN allocates a resource of the MN to a bearer or whether the MN allocates a resource of the SN to a bearer, so that the MN determines whether to allocate the resource of the MN or the resource of the SN to the bearer. The fourth indication information may be obtained by the PGW network element from a PCRF network element. The PCRF network element may determine the fourth indication information based on a QCI of the bearer.

Alternatively, the MME network element may determine the fourth indication information based on a QCI of the bearer, and sends the fourth indication information to the master network node. The fourth indication information is used to indicate whether the master network node allocates a resource of the master network node to the bearer or whether the master network node allocates a resource of the secondary network node to the bearer, so that the master network node determines whether to allocate the resource of the master network node or the resource of the secondary network node to the bearer.

In a possible implementation, if the PGW network element does not perform step S605, the PGW network element may trigger an IP-CAN session management procedure. Between step S604 and step S606, the following steps may be included.

Step S605a: The PGW network element sends an IP-CAN session management request to the PCRF network element, and correspondingly, the PCRF network element receives the IP-CAN session management request from the PGW network element.

The IP-CAN session management request includes the first indication information, may further include the second APN-AMBR information, and may further include the first APN-AMBR information.

Step S605b: The PCRF network element determines third APN-AMBR information based on the first indication information.

If the IP-CAN session management request includes the first indication information, the PCRF network element may determine the third APN-AMBR information based on the first indication information.

If the IP-CAN session management request includes the first indication information, the PCRF network element may alternatively determine the third APN-AMBR information based on the first indication information and the second configuration information. This is the same as that the MME network element determines the first APN-AMBR information based on the first indication information and the second configuration information, and only an execution body is different.

If the IP-CAN session management request includes the first indication information and the second APN-AMBR information, the PCRF network element determines the third APN-AMBR information based on the first indication information and the second APN-AMBR information. This is the same as that the MME network element determines the first APN-AMBR information based on the first indication information and the second APN-AMBR information, and only an execution body is different.

If the IP-CAN session management request includes the first indication information, the second APN-AMBR information, and the first APN-AMBR information, the PCRF network element may determine the third APN-AMBR information with reference to the first indication information and the second APN-AMBR information on a basis of the first APN-AMBR information.

Step S605c: The PCRF network element sends an IP-CAN session management response to the PGW network element, and correspondingly, the PGW network element receives the IP-CAN session management response from the PCRF network element.

The IP-CAN session management response is used to respond to the IP-CAN session management request. The IP-CAN session management response includes the third APN-AMBR information.

After receiving the third APN-AMBR information, the MME network element may send the third APN-AMBR information to the terminal. The third APN-AMBR information is used by the terminal to control the data transmission rate based on the third APN-AMBR information. That is, the terminal adjusts the data transmission rate on the terminal based on the third APN-AMBR information, to avoid that the data transmission rate on the terminal exceeds the value of the third APN-AMBR parameter, or the terminal increases the data transmission rate on the terminal based on the third APN-AMBR information, to ensure data transmission efficiency.

After receiving the third APN-AMBR information, the MME network element may determine third UE-AMBR information through calculation based on the third APN-AMBR information, and send the third UE-AMBR information to the MN, so that the MN can control a data transmission rate on the MN based on the third UE-AMBR information.

The embodiment shown in FIG. 7 is applied to a 5GS MR-DC scenario. When the terminal suddenly uses NR for access or suddenly does not use NR for access, the MME network element determines the first APN-AMBR information based on whether the terminal uses NR for access. The MME network element may notify the PGW network element of the first APN-AMBR information, so that the PGW network element adjusts the data transmission rate of the terminal on the PGW network element based on the first APN-AMBR information, so as to implement adaptive adjustment of the data transmission rate of the terminal based on the first APN-AMBR information, thereby avoiding data packet loss and also ensuring data transmission efficiency. Alternatively, the PGW network element may determine the third APN-AMBR information based on the first indication information, and adjust the data transmission rate of the terminal on the PGW network element based on the third APN-AMBR information, so as to implement adaptive adjustment of the data transmission rate of the terminal based on the first APN-AMBR information.

Figure 8:
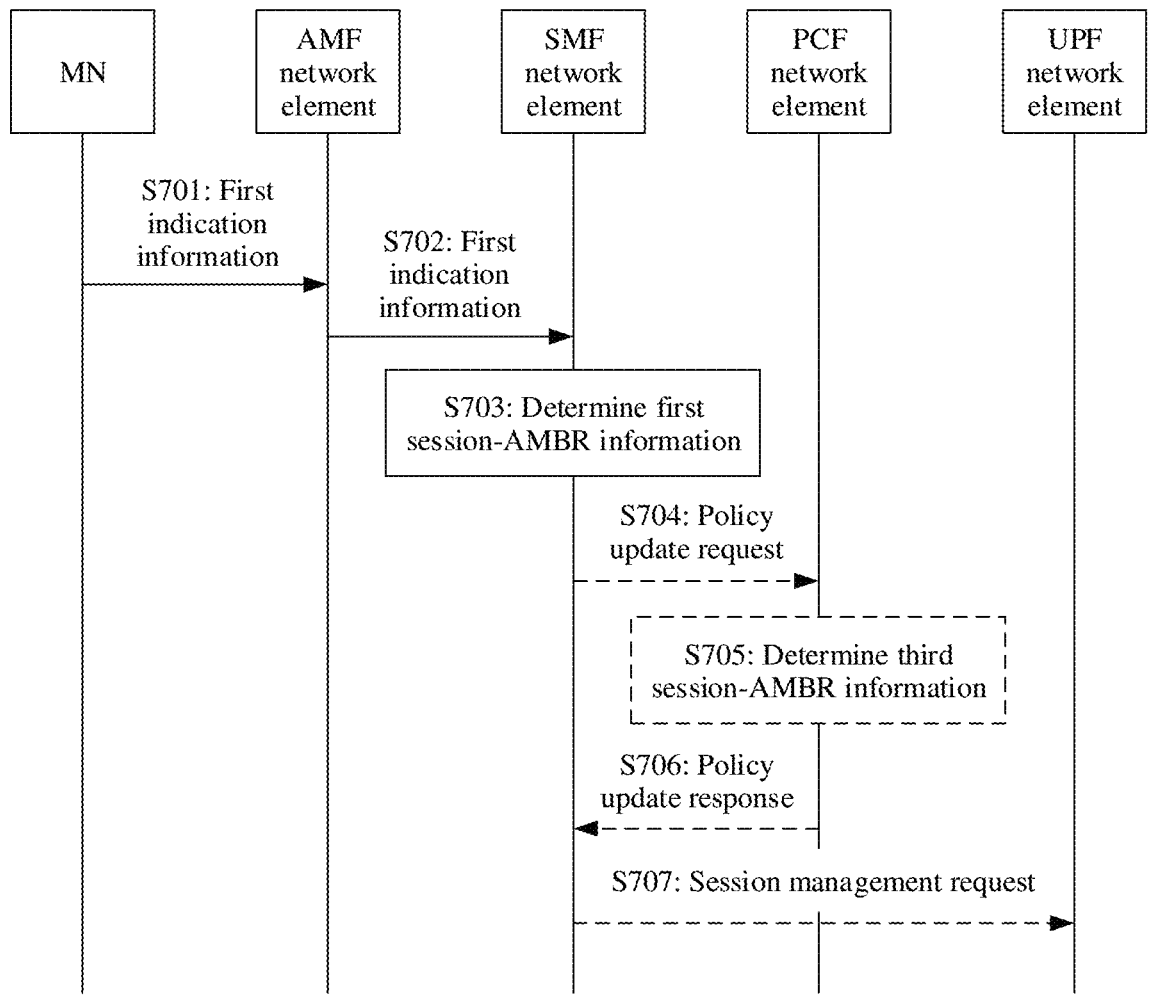
FIG. 8 is a schematic flowchart of a rate adjustment method according to Embodiment 2 of this application.

An example is used in which the rate adjustment system shown in FIG. 5 is applied to the MR-DC network architectures shown in FIG. 1 to FIG. 3. FIG. 8 is a schematic flowchart of a rate adjustment method according to Embodiment 2 of this application. An AMF network element or an SMF network element in the method may be implemented by the communications device shown in FIG. 6. The method may include but is not limited to the following steps.

Step S701: An MN sends first indication information to the AMF network element, and correspondingly, the AMF network element receives the first indication information from the MN.

The first indication information may be sent by using a first message, that is, the first indication information is carried in the first message. The first message may be a notification message (notify), or may be another type of message. This is not limited in this embodiment of this application.

For the first indication information, refer to a specific description of the first indication information in step S601 in the embodiment shown in FIG. 7, and details are not described herein again.

Step S702: The AMF sends the first indication information to the SMF network element, and correspondingly, the SMF network element receives the first indication information from the AMF network element.

The AMF network element may receive the first indication information from the MN, and send the first indication information to the SMF network element by using the first message, so that the SMF network element learns of the first indication information.

The AMF network element may determine, based on second indication information, a location of a terminal, third indication information, and first configuration information, the first indication information indicating whether the terminal uses NR for access.

The second indication information and the location of the terminal are sent by the MN to the AMF network element. The second indication information is used to indicate a dual-connectivity capability of the MN, and the location of the terminal may be a tracking area to which the terminal belongs.

The third indication information is sent by the terminal to the AMF network element. The third indication information is used to indicate whether the terminal has a dual-connectivity capability, that is, whether the terminal can simultaneously connect to two network nodes. The terminal may send the third indication information to the AMF network element before step S601, and may send the third indication information to the AMF network element by using a NAS message, that is, the third indication information is carried in the NAS message. The NAS message may be a registration request message (Registration Request).

For the first configuration information, refer to a specific description of the first configuration information in step S601 in the embodiment shown in FIG. 7, and details are not described herein again.

When the MN has the dual-connectivity capability and the terminal has the dual-connectivity capability, if the terminal enters a tracking area supporting dual connectivity from a tracking area not supporting dual connectivity, in this case, the tracking area to which the location of the terminal belongs supports dual connectivity, and the AMF network element may determine first indication information indicating that the terminal uses NR for access; or if the terminal enters a tracking area not supporting dual connectivity from a tracking area supporting dual connectivity, in this case, the tracking area to which the location of the terminal belongs does not support dual connectivity, and the AMF network element may determine first indication information indicating that the terminal does not use NR for access. After determining the first indication information indicating whether the terminal uses NR for access, the AMF network element sends the first indication information to the SMF network element by using the first message, so that the SMF network element learns of the first indication information.

Step S703: The SMF network element determines first session-AMBR information based on the first indication information.

Session-AMBR information may include a session-AMBR parameter and a value of the session-AMBR parameter, and is used to control a data transmission rate. A session-AMBR is used to restrict an aggregate maximum bit rate of all non-GBR bearer QoS flows of a terminal on a specific session. Session-AMBR rate control may be performed on a terminal. That is, the terminal may adjust a data transmission rate based on the value of the session-AMBR parameter, for example, control a maximum value of the data transmission rate on the terminal not to exceed the value of the session-AMBR parameter. Alternatively, rate control may be performed on a UPF network element. That is, the UPF network element may adjust a data transmission rate based on the value of the session-AMBR parameter.

In a possible implementation, the SMF network element may determine the first session-AMBR information based on access information and second configuration information. The second configuration information includes session-AMBR information that exists when NR is used for access or session-AMBR information that exists when NR is not used for access. For example, if the access information indicates that the terminal uses NR for access, the SMF network element may select, from the second configuration information, the session-AMBR information that exists when NR is used for access, and use the session-AMBR information as the first session-AMBR information.

Not using NR for access may be that the terminal uses an E-UTRAN for data transmission, and does not use NR for access to a network node. Using NR for access may be that the terminal uses NR for data transmission.

In a possible implementation, the first message further includes second session-AMBR information. The second session-AMBR information is session-AMBR information suggested by the MN. The MN may determine the suggested session-AMBR information based on actual usage of the MN. The SMF network element may determine the first session-AMBR information based on the access information and the second session-AMBR information, that is, determine the first session-AMBR information with reference to the access information and the second session-AMBR information. For example, the session management network element may determine a piece of session-AMBR information based on the access information, and then adjust the session-AMBR information based on the second session-AMBR information, so as to obtain the first session-AMBR information.

In a possible implementation, after determining the first session-AMBR information, the session management network element may send the first session-AMBR information to the UPF network element. The first session-AMBR information is used by the UPF network element to control the data transmission rate based on the first session-AMBR information. That is, the UPF network element adjusts the data transmission rate of the terminal on the UPF network element based on the first session-AMBR information, to avoid that the data transmission rate of the terminal on the UPF network element exceeds the value of the first session-AMBR parameter, or the UPF network element increases the data transmission rate of the terminal on the UPF network element based on the first session-AMBR information, to ensure data transmission efficiency.

The SMF network element may add the first session-AMBR information to a session management request, and send the session management request to the UPF network element. The session management request further includes an N4 session identifier and a QoS flow identity (QFI). In other words, step S707 may be performed after step S703.

In a possible implementation, after determining the first session-AMBR information, the SMF network element may send the first session-AMBR information to the terminal by using the AMF network element. That is, the SMF network element sends the first session-AMBR information to the AMF network element, the AMF network element sends the first session-AMBR information to the terminal, and the terminal updates session-AMBR information in the terminal based on the first session-AMBR information.

If a value of the session-AMBR parameter in session-AMBR information previously sent by the SMF network element to the terminal by using the AMF network element is comparatively large, for example, greater than a value of the first session-AMBR parameter in the currently determined first session-AMBR information, the SMF network element may not send the currently determined first session-AMBR information to the terminal, and the terminal may not adjust the data transmission rate, thereby reducing system signaling.

In a possible implementation, after determining the first session-AMBR information, the SMF network element may send the first session-AMBR information to the MN by using the access management network element. That is, the SMF network element sends the first session-AMBR information to the AMF network element; the AMF network element sends the first session-AMBR information to the MN; and the MN updates session-AMBR information in the MN based on the first session-AMBR information, and determines first UE-AMBR information through calculation based on the first session-AMBR information, so that the MN can control the data transmission rate based on the first UE-AMBR information.

UE-AMBR information may include a UE-AMBR parameter and a value of the UE-AMBR parameter, and is used to control a data transmission rate. A UE-AMBR is used to restrict an aggregate maximum bit rate of all non-GBR QoS flows of a terminal. UE-AMBR rate control may be performed on the MN. That is, the MN adjusts the data transmission rate of the terminal based on the value of the UE-AMBR parameter, for example, controls a maximum value of the data transmission rate of the terminal on the MN not to exceed the value of the UE-AMBR parameter.

The first session-AMBR information sent by the SMF network element to the AMF network element may be carried in an N11 message. The N11 message may be a session creation response, or may be a session update response. The N11 message may further include a session identifier, the QFI, and the first session-AMBR information. For example, the N11 message may include an N2 SM (the session identifier, the QFI, and the first session-AMBR information) and an N1 SM (the session identifier, the QFI, and the first session-AMBR information).

The AMF network element sends an N2 message to the MN. The N2 message includes the first UE-AMBR information, the session identifier, the QFI, and the first session-AMBR information, and is used to update session-AMBR information in the UE.

In a possible implementation, the following steps may be further included after step S703.

Step S704: The SMF network element sends a policy update request to a PCF network element, and correspondingly, the PCF network element receives the policy update request from the SMF network element.

The policy update request includes the first indication information, may further include the second session-AMBR information, and may further include the first session-AMBR information. The policy update request may be an SM policy update request.

Step S705: The PCF network element determines third session-AMBR information based on the first indication information.

If a second bearer management request includes the first indication information and the first session-AMBR information, the PCF network element may determine the third session-AMBR information based on the first indication information and the first session-AMBR information.

If a second bearer management request includes the first indication information and the first session-AMBR information, the PCF network element may alternatively determine the third session-AMBR information based on the first indication information and the second configuration information on a basis of the first session-AMBR information.

If a second bearer management request includes the first indication information, the second session-AMBR information, and the first session-AMBR information, the PCF network element may determine the third session-AMBR information based on the first indication information and the second session-AMBR information on a basis of the first session-AMBR information.

Step S706: The PCF network element sends a policy update response to the SMF network element, and correspondingly, the SMF network element receives the policy update response from the PCF network element.

The policy update response includes the third session-AMBR information. The policy update response may be an SM policy update response.

In a possible implementation, the policy update response further includes fourth indication information. The SMF network element may further send the fourth indication information to the MN by using the AMF network element. The fourth indication information is used to indicate whether the MN allocates a resource of the MN to a quality of service flow of a session or whether the MN allocates a resource of an SN to a quality of service flow of a session, that is, indicate whether the MN allocates the resource of the MN or the resource of the SN to the quality of service flow of the session, so that the MN determines whether to allocate the resource of the MN or the resource of the SN to the quality of service flow of the session.

In a possible implementation, the SMF network element may determine fourth indication information based on a 5QI. The SMF network element may further send the fourth indication information to the MN by using the AMF network element. The fourth indication information is used to indicate whether the MN allocates a resource of the MN to a quality of service flow of a session or whether the MN allocates a resource of an SN to a quality of service flow of a session, that is, indicate whether the MN allocates the resource of the MN or the resource of the SN to the quality of service flow of the session, so that the MN determines whether to allocate the resource of the MN or the resource of the SN to the quality of service flow of the session.

After receiving the third session-AMBR information, the SMF network element may send the third session-AMBR information to the terminal by using the AMF network element. That is, the SMF network element sends the third session-AMBR information to the AMF network element, the AMF network element sends the third session-AMBR information to the terminal, and the terminal updates session-AMBR information in the terminal based on the third session-AMBR information.

If a value of the session-AMBR parameter in session-AMBR information previously sent by the SMF network element to the terminal by using the AMF network element is comparatively large, for example, greater than a value of the third session-AMBR parameter in the currently determined third session-AMBR information, the SMF network element may not send the currently determined third session-AMBR information to the terminal, and the terminal may not adjust the data transmission rate, thereby reducing system signaling.

After receiving the third session-AMBR information, the SMF network element may also send the third session-AMBR information to the MN by using the AMF network element. That is, the SMF network element sends the third session-AMBR information to the AMF network element; the AMF network element sends the third session-AMBR information to the MN; and the MN updates session-AMBR information in the MN based on the third session-AMBR information, and may determine third UE-AMBR information through calculation based on the third session-AMBR information, so that the MN can control the data transmission rate based on the third UE-AMBR information.

The SMF network element sends an N11 message to the AMF network element. The N11 message may be a session creation response, or may be a session update response. For example, the N11 message may include an N2 SM (a session identifier, a QFI, the fourth indication information, and the first session-AMBR information) and an N1 SM (a session identifier, a QFI, and the first session-AMBR information).

The AMF network element sends an N2 message to the MN. The N2 message includes the session identifier, the QFI, the fourth indication information, and the first UE-AMBR information, and is used to update session-AMBR information in the UE.

In a possible implementation, after receiving the third session-AMBR information, the SMF network element sends the third session-AMBR information to the UPF network element. The third session-AMBR information is used by the UPF network element to control a data transmission rate on the UPF network element based on the third session-AMBR information.

The SMF network element may add the third session-AMBR information to a session management request, and send the session management request to the UPF network element. The session management request further includes an N4 session identifier and a QoS flow identity (QFI). In other words, step S707 may be performed after step S703.

It should be noted that after performing step S703, the SMF network element sends the first session-AMBR information to the UPF network element, that is, the SMF network element does not perform step S704 to step S706; or after performing step S703, the SMF network element performs step S704 to step S706, and after performing step S706, sends the third session-AMBR information to the UPF network element.

The embodiment shown in FIG. 8 is applied to a 5GS MR-DC scenario. When the terminal suddenly uses NR for access or suddenly does not use NR for access, the AMF network element determines the first session-AMBR information based on whether the terminal uses NR for access. The MME network element may notify the UPF network element of the first session-AMBR information, so that the UPF network element adjusts the data transmission rate on the terminal based on the first session-AMBR information, so as to implement adaptive adjustment of the data transmission rate of the terminal on the UPF network element based on the first session-AMBR information, thereby avoiding data packet loss and also ensuring data transmission efficiency.

Figure 9A:
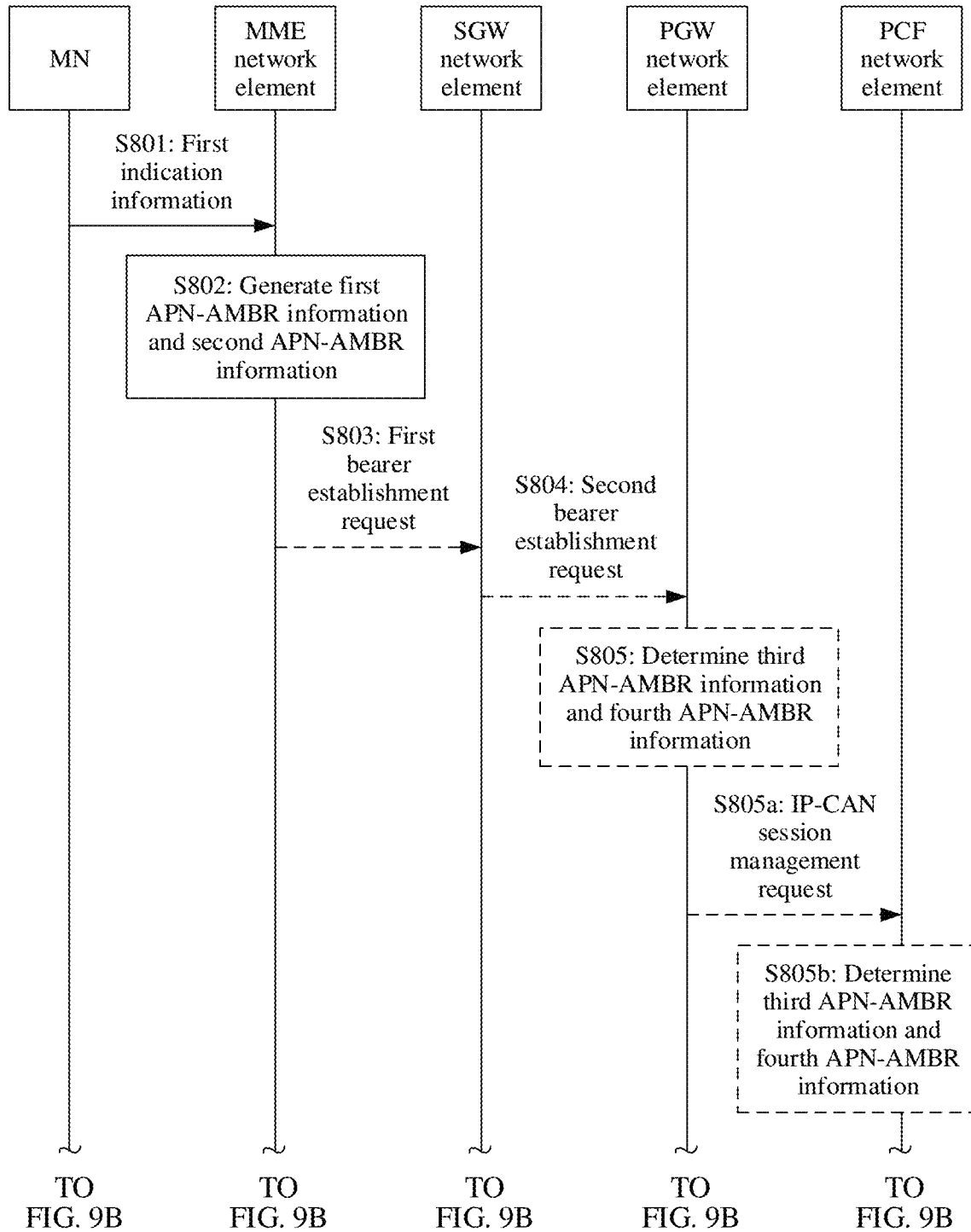
FIG. 9A and FIG. 9B are a schematic flowchart of a rate adjustment method according to Embodiment 3 of this application.
Figure 9B:
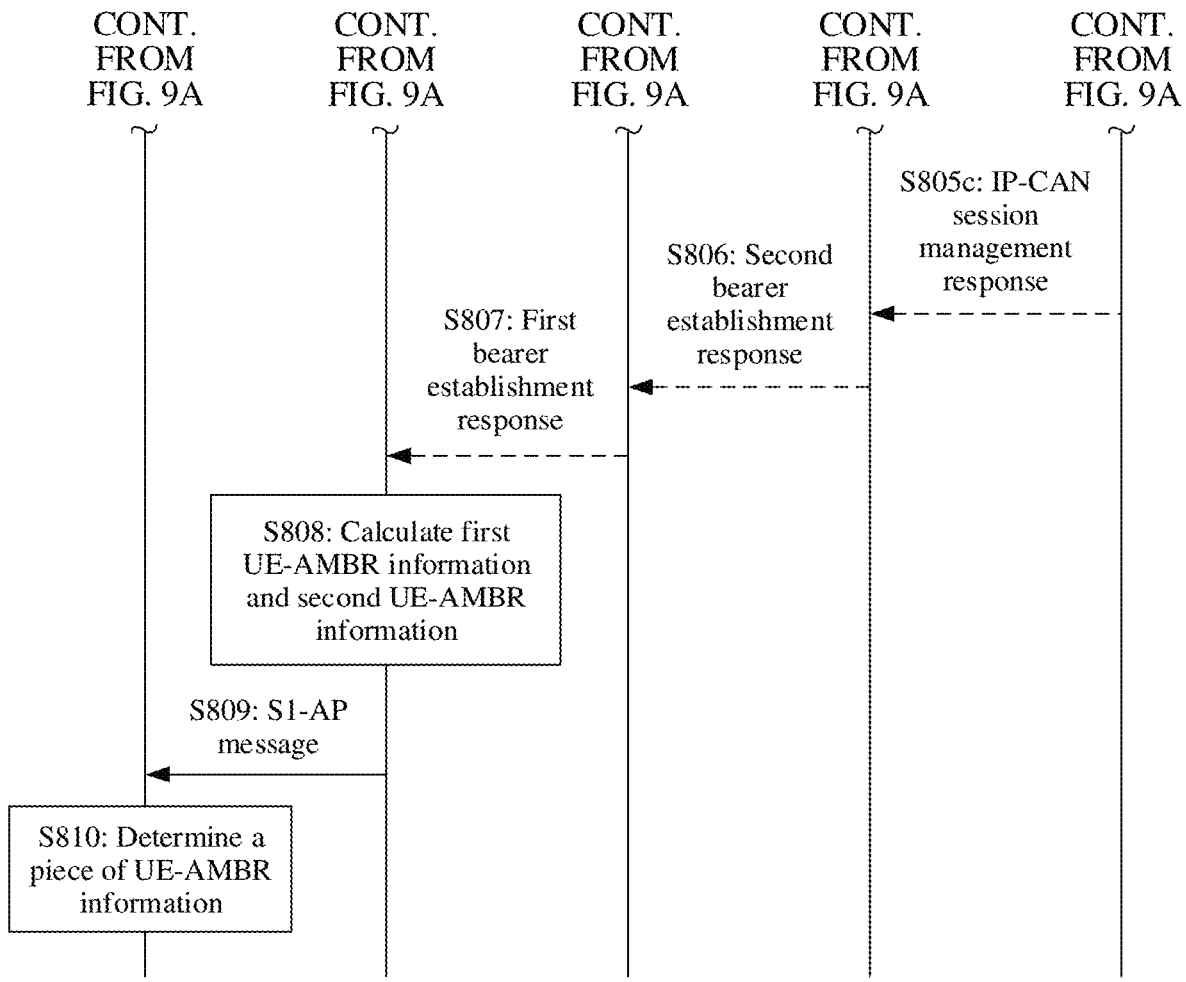

An example is used in which the rate adjustment system shown in FIG. 4 is applied to the MR-DC network architectures shown in FIG. 1 to FIG. 3. FIG. 9A and FIG. 9B are a schematic flowchart of a rate adjustment method according to Embodiment 3 of this application. An MME network element in the method may be implemented by the communications device shown in FIG. 6. The method may include but is not limited to the following steps.

Step S801: An MN sends first indication information to the MME network element, and correspondingly, the MME network element receives the first indication information from the MN.

Step S802: The MME network element determines first APN-AMBR information and second APN-AMBR information based on the first indication information.

The first APN-AMBR information is APN-AMBR information that exists when NR is used for access, and the second APN-AMBR is APN-AMBR information that exists when NR is not used for access.

Step S803: The MME network element sends a first bearer establishment request to an SGW network element, and correspondingly, the SGW network element receives the first bearer establishment request from the MME network element.

The first bearer establishment request includes the first indication information, further includes the first APN-AMBR information and the second APN-AMBR information, and further includes a bearer identifier.

The first bearer establishment request further includes fifth APN-AMBR information. The fifth APN-AMBR information is APN-AMBR information suggested by the MN. The fifth APN-AMBR information and access information are used to determine third APN-AMBR information and fourth APN-AMBR information, for example, used by a PGW network element to adjust the first APN-AMBR information and the second APN-AMBR information based on the fifth APN-AMBR information and the access information, to obtain the third APN-AMBR information and the fourth APN-AMBR information.

Step S804: The SGW network element sends a second bearer establishment request to the PGW network element, and correspondingly, the PGW network element receives the second bearer establishment request from the SGW network element.

The second bearer establishment request includes the first indication information, further includes the first APN-AMBR information and the second APN-AMBR information, and further includes the bearer identifier.

The second bearer establishment request further includes the fifth APN-AMBR information carried in the first bearer establishment request.

Step S805: The PGW network element determines the third APN-AMBR information and the fourth APN-AMBR information based on the first indication information.

The third APN-AMBR information is APN-AMBR information that exists when NR is used for access, and the fourth APN-AMBR is APN-AMBR information that exists when NR is not used for access.

Step S806: The PGW network element sends a second bearer establishment response to the SGW network element, and correspondingly, the SGW network element receives the second bearer establishment response from the PGW network element.

The second bearer establishment response includes the third APN-AMBR information and the fourth APN-AMBR information, and further includes fourth indication information.

Step S807: The SGW network element sends a first bearer establishment response to the MME network element, and correspondingly, the MME network element receives the first bearer establishment response from the SGW network element.

The first bearer establishment response includes the third APN-AMBR information and the fourth APN-AMBR information, and further includes the fourth indication information.

Step S808: The MME network element obtains first UE-AMBR information and second UE-AMBR information through calculation.

The MME network element may obtain the first UE-AMBR information and the second UE-AMBR information through calculation based on the first APN-AMBR information and the second APN-AMBR information. The first UE-AMBR information is APN-AMBR information that exists when NR is used for access, and the second UE-AMBR is APN-AMBR information that exists when NR is not used for access.

The MME network element may obtain third UE-AMBR information and fourth UE-AMBR information through calculation based on the third APN-AMBR information and the fourth APN-AMBR information. The third UE-AMBR information is APN-AMBR information that exists when NR is used for access, and the fourth UE-AMBR is APN-AMBR information that exists when NR is not used for access.

Step S809: The MME network element sends an S1-AP request message to the MN, and correspondingly, the MN receives the S1-AP request message from the MME network element.

The S1-AP request message includes the first UE-AMBR information, the second UE-AMBR information, and the fourth indication information, and further includes the first APN-AMBR information, the second APN-AMBR information, and the bearer identifier. The S1-AP request message may be an initial terminal context setup (Initial UE context Setup) message or a downlink non-access stratum transport (Downlink NAS Transport) message.

The S1-AP request message includes the third UE-AMBR information, the fourth UE-AMBR information, and the fourth indication information, and further includes the third APN-AMBR information, the fourth APN-AMBR information, and the bearer identifier.

Step S810: The MN determines a piece of UE-AMBR information based on whether a terminal uses NR.

The MN selects one from the first UE-AMBR information and the second UE-AMBR information based on whether the terminal uses NR, or selects one from the third UE-AMBR information and the fourth UE-AMBR information based on whether the terminal uses NR for access.

The MN determines, based on the fourth indication information, whether to allocate a resource of the MN or a resource of a secondary network node to a bearer.

The MN triggers a radio resource control (RRC) connection reconfiguration procedure, and sends the bearer identifier, the first APN-AMBR information, and the second APN-AMBR information to the terminal, or sends the bearer identifier, the third APN-AMBR information, and the fourth APN-AMBR information to the terminal. The terminal determines, based on the terminal, a piece of APN-AMBR information to be used.

In a possible implementation, if the PGW network element does not perform step S805, the PGW network element may trigger an IP-CAN session management procedure. Between step S804 and step S806, the following steps may be included.

Step S805a: The PGW network element sends an IP-CAN session establishment request to a PCRF network element, and correspondingly, the PCRF network element receives the IP-CAN session establishment request from the PGW network element.

Step S805b: The PCRF network element determines the third APN-AMBR information and the fourth APN-AMBR information based on the first indication information.

Step S805c: The PCRF network element sends an IP-CAN session establishment response to the PGW network element, and correspondingly, the PGW network element receives the IP-CAN session establishment response from the PCRF network element.

The embodiment shown in FIG. 9A and FIG. 9B is applied to a 5GS MR-DC scenario. When the terminal suddenly uses NR for access or suddenly does not use NR for access, the MME network element generates the first APN-AMBR information and the second APN-AMBR information based on whether the terminal uses NR for access, and may send the first APN-AMBR information and the second APN-AMBR information to the PGW network element, so that the PGW network element determines, according to an indication from the MME network element, a piece of AMBR information to be used. Alternatively, the MME network element sends the third APN-AMBR information and the fourth APN-AMBR information to the PGW network element, so that the PGW network element determines, according to an indication from the MME network element, a piece of AMBR information to be used. Alternatively, the MME network element may send the first APN-AMBR information and the second APN-AMBR information to the terminal and the MN, so that the terminal and the MN can select a piece of AMBR information for use based on whether the terminal uses NR for access.

The embodiment shown in FIG. 9A and FIG. 9B is applicable to a bearer establishment procedure. For a bearer modification procedure, the MME network element may generate the first APN-AMBR information or the second APN-AMBR information based on the first indication information, that is, generate a piece of APN-AMBR information, and send a first bearer modification request to the SGW network element, where the first bearer modification request includes the APN-AMBR information; the SGW network element sends a second bearer modification request to the PGW network element, where the second bearer modification request includes the APN-AMBR information; and the PGW network element controls the data transmission rate based on the APN-AMBR information. Alternatively, the MME network element sends a first bearer modification request to the SGW network element, where the first bearer modification request includes the first indication information; the SGW network element sends a second bearer modification request to the PGW network element, where the second bearer modification request includes the first indication information; and the PGW network element determines a piece of APN-AMBR information based on the first indication information, and controls the data transmission rate based on the APN-AMBR information.

Figure 10:
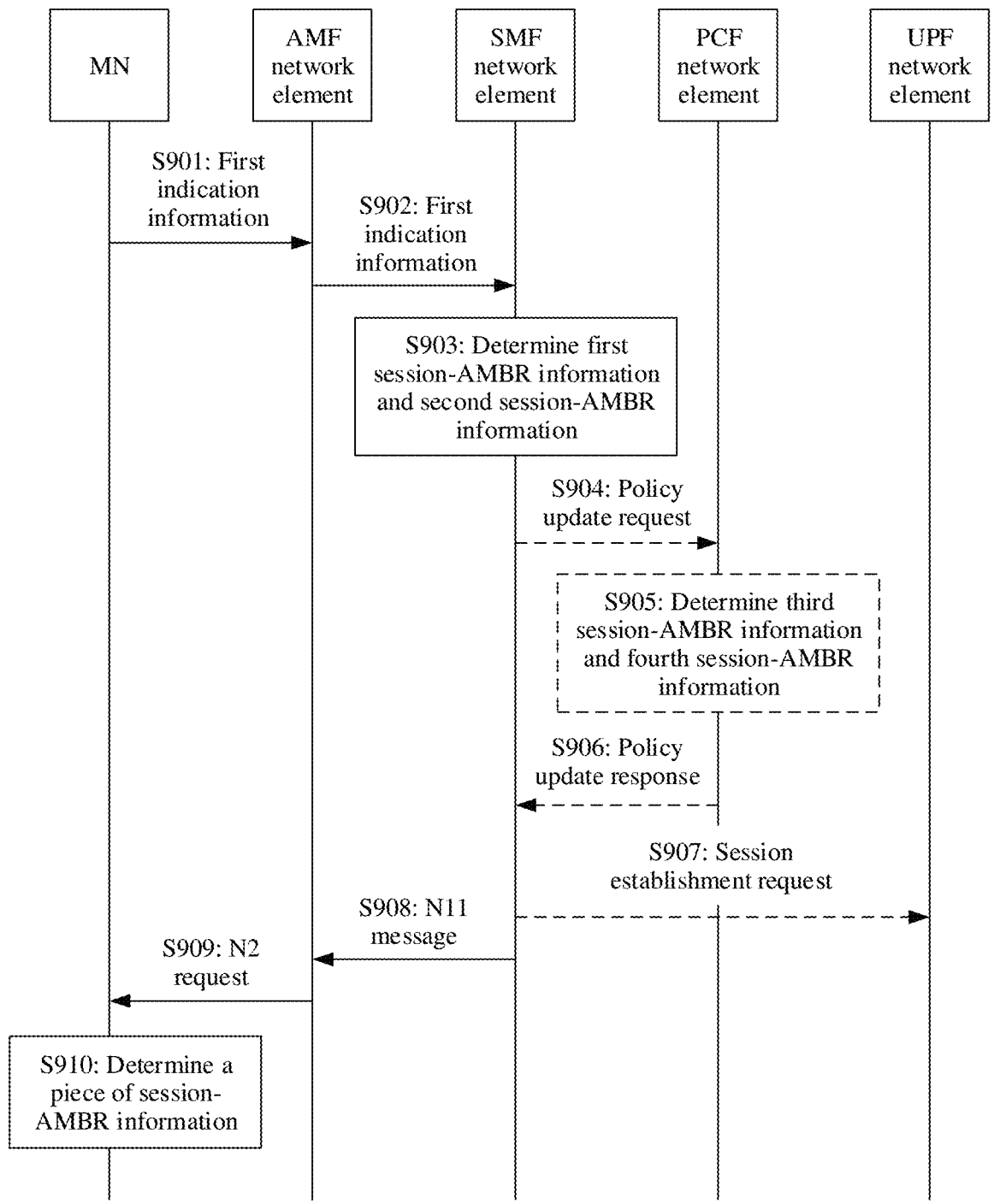
FIG. 10 is a schematic flowchart of a rate adjustment method according to Embodiment 4 of this application.

An example is used in which the rate adjustment system shown in FIG. 5 is applied to the MR-DC network architectures shown in FIG. 1 to FIG. 3. FIG. 10 is a schematic flowchart of a rate adjustment method according to Embodiment 4 of this application. An AMF network element or an SMF network element in the method may be implemented by the communications device shown in FIG. 6. The method may include but is not limited to the following steps.

Step S901: An MN sends first indication information to the AMF network element, and correspondingly, the AMF network element receives the first indication information from the MN.

Step S902: The AMF sends the first indication information to the SMF network element, and correspondingly, the SMF network element receives the first indication information from the AMF network element.

Step S903: The SMF network element determines first session-AMBR information and second session-AMBR information based on the first indication information.

The first session-AMBR information is session-AMBR information that exists when NR is used for access, and the second session-AMBR information is session-AMBR information that exists when NR is not used for access.

Step S904: The SMF network element sends a policy update request to a PCF network element, and correspondingly, the PCF network element receives the policy update request from the SMF network element.

The policy update request includes the first session-AMBR information, the second session-AMBR information, and the first indication information.

Step S905: The PCF network element determines third session-AMBR information and fourth session-AMBR information based on the first indication information.

Step S906: The PCF network element sends a policy update response to the SMF network element, and correspondingly, the SMF network element receives the policy update response from the PCF network element.

Step S907: The SMF network element sends a session establishment request to a UPF network element, and correspondingly, the UPF network element receives the session establishment request from the SMF network element.

The session management request includes the first session-AMBR information, the second session-AMBR information, and the indication information, so that the UPF network element selects one from the first session-AMBR information and the second session-AMBR information based on the indication information to control a data transmission rate.

The session management request includes the third session-AMBR information, the fourth session-AMBR information, and the indication information, so that the UPF network element selects one from the third session-AMBR information and the fourth session-AMBR information based on the indication information to control a data transmission rate.

Step S908: The SMF network element sends an N11 message to the AMF network element, and correspondingly, the AMF network element receives the N11 message from the SMF network element.

The N11 message includes an N2 SM and an N1 SM. The N2 SM includes a session identifier, the first session-AMBR, the second session-AMBR, and fourth indication information. The N11 SM includes the session identifier, the first session-AMBR, the second session-AMBR, and the indication information. The N11 message may be a session establishment response.

The N11 message includes an N2 SM and an N1 SM. The N2 SM includes a session identifier, the third session-AMBR, the fourth session-AMBR, and fourth indication information. The N1 SM includes the session identifier, the third session-AMBR, the fourth session-AMBR, and the indication information.

Step S909: The AMF network element sends an N2 request to the MN, and correspondingly, the MN receives the N2 request from the AMF network element.

The N2 request includes the N2 SM and the N1 SM. The N2 SM includes the session identifier, the first session-AMBR, the second session-AMBR, and the fourth indication information. The N1 SM includes the session identifier, the first session-AMBR, the second session-AMBR, and the indication information.

The N2 request includes the N2 SM and the N1 SM. The N2 SM includes the session identifier, the third session-AMBR, the fourth session-AMBR, and the fourth indication information. The N1 SM includes the session identifier, the third session-AMBR, the fourth session-AMBR, and the indication information.

Step S910: The MN determines a piece of session-AMBR information based on whether a terminal uses NR.

The MN selects one from the first session-AMBR information and the second session-AMBR information based on whether the terminal uses NR, or selects one from the third session-AMBR information and the fourth session-AMBR information based on whether the terminal uses NR for access.

The MN determines, based on the fourth indication information, whether to place a QFI on the MN or on a secondary network node.

The MN triggers an RRC connection reconfiguration procedure, and sends the session identifier, the first session-AMBR information, and the second session-AMBR information to the terminal, or sends the session identifier, the third session-AMBR information, and the fourth session-AMBR information to the terminal. The terminal determines, based on the terminal, a piece of session-AMBR information to be used.

The embodiment shown in FIG. 1 is applied to a 5GS MR-DC scenario. When the terminal suddenly uses NR for access or suddenly does not use NR for access, the SMF network element generates the first session-AMBR information and the second session-AMBR information based on whether the terminal uses NR for access, and sends the first session-AMBR information and the second session-AMBR information to the UPF network element, so that the UPF network element determines, according to an indication from the SMF network element, an AMBR to be used. Alternatively, the SMF network element may send the third session-AMBR information and the fourth session-AMBR information to the UPF network element, so that the UPF network element determines, according to an indication from the SMF network element, an AMBR to be used.

Alternatively, the SMF network element may send the first session-AMBR information and the second session-AMBR information to the terminal and the MN, so that the terminal and the MN can select a piece of AMBR information for use based on whether the terminal uses NR for access.

The embodiment shown in FIG. 1 is applicable to a session establishment procedure. For a session modification procedure, the SMF network element may generate the first session-AMBR information or the second session-AMBR information based on the first indication information, that is, generate a piece of session-AMBR information, and send a session modification request to the UPF network element, where the session modification request includes the session-AMBR information; and the UPF network element controls the data transmission rate based on the session-AMBR information. Alternatively, the SMF network element sends a session modification request to the UPF network element, where the session modification request includes the first indication information; and the UPF network element determines a piece of session-AMBR information based on the first indication information, and controls the data transmission rate based on the session-AMBR information.

The foregoing describes in detail the method provided in the embodiments of this application, and the following describes an apparatus provided in the embodiments of this application.

Figure 11:
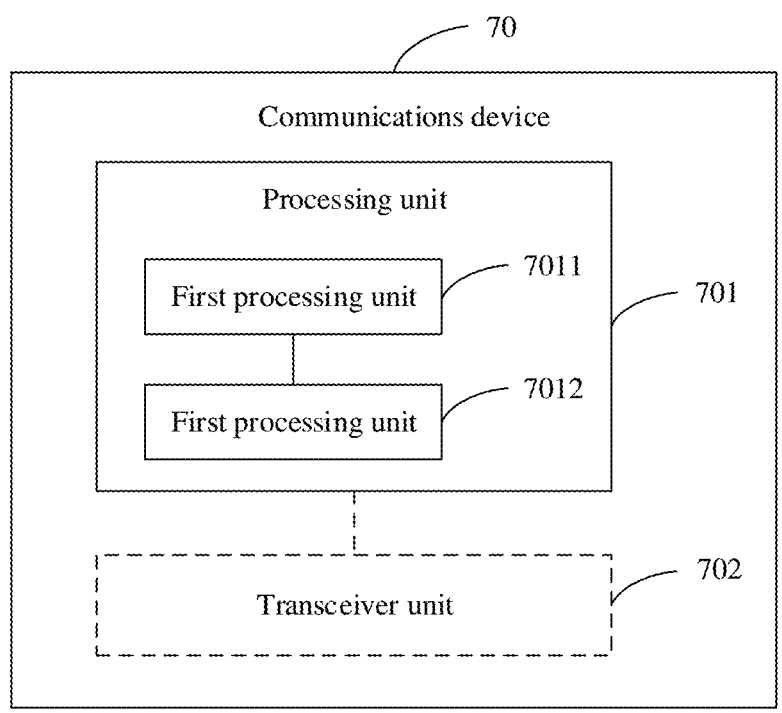
FIG. 11 is a schematic diagram of a logical structure of a communications device according to an embodiment of this application.

FIG. 11 is a schematic diagram of a logical structure of a communications device according to an embodiment of this application. The communications device 70 may be the mobility management network in FIG. 4, may be the session management network element in FIG. 5, or may be the access management network element in FIG. 5.

The communications device 70 may include a processing unit 701. A related function/procedure implemented by the processing unit 701 may be implemented by the processor 6oi in FIG. 6 by invoking the computer-executable instruction stored in the memory 603. The processing unit 701 may include a first processing unit 7011 and a second processing unit 7012. The communications device 70 may further include a transceiver unit 702. A related function/procedure implemented by the transceiver unit 702 may be implemented by the communications interface 604 in FIG. 6.

If the communications device 70 is the mobility management network element in FIG. 4, the first processing unit 7011 is configured to determine access information indicating whether a terminal uses NR for access, and the second processing unit 7012 is configured to: determine first APN-AMBR information based on the access information.

In a possible implementation, the transceiver unit 702 is configured to receive a first message from a master network node, where the first message includes first indication information, and the first indication information is used to indicate whether the terminal uses NR for access. The first processing unit 701 is specifically configured to determine, based on the first indication information, the access information indicating whether the terminal uses NR for access.

In a possible implementation, the transceiver unit 702 is configured to: receive, by the mobility management network element, a second message from the master network node, where the second message includes second indication information and a location of the terminal, and the second indication information is used to indicate a dual-connectivity capability of the master network node; and receive, by the mobility management network element, third indication information from the terminal, where the third indication information is used to indicate a dual-connectivity capability of the terminal.

The first processing unit 7011 is specifically configured to: determine, based on the second indication information, the location of the terminal, the third indication information, and first configuration information, the access information indicating whether the terminal uses NR for access. The first configuration information includes a tracking area identifier and a dual-connectivity capability of a tracking area corresponding to the tracking area identifier.

In a possible implementation, the second processing unit 7012 is specifically configured to: determine the first APN-AMBR information based on the access information and second configuration information. The second configuration information includes APN-AMBR information that exists when NR is used for access or APN-AMBR information that exists when NR is not used for access.

In a possible implementation, the first message further includes second APN-AMBR information. The second APN-AMBR information is APN-AMBR information suggested by the master network node. The second processing unit 7012 is specifically configured to: determine the first APN-AMBR information based on the access information and the second APN-AMBR information.

In a possible implementation, the transceiver unit 702 is configured to send the first APN-AMBR information to the terminal. The first APN-AMBR information is used to control a data transmission rate.

In a possible implementation, the transceiver unit 702 is configured to: send a first bearer management request to a serving network element, where the first bearer management request includes the access information, so that the serving network element sends a second bearer management request to a packet data network element, where the second bearer management request includes the access information, the access information is used to determine third APN-AMBR information, and the third APN-AMBR information is used by the packet data network element to control a data transmission rate; and receive a first bearer management response from the serving network element, where the first bearer management response includes the third APN-AMBR information.

In a possible implementation, the first bearer management request further includes the second APN-AMBR information, and the second bearer management request further includes the second APN-AMBR information. The second APN-AMBR information is APN-AMBR information suggested by the master network node. The second APN-AMBR information and the access information are used to determine the third APN-AMBR information.

In a possible implementation, a second bearer management response further includes fourth indication information; the first bearer management response further includes the fourth indication information; and the transceiver unit 702 is configured to send the fourth indication information to the master network node. The fourth indication information is used to indicate whether the master network node allocates a resource of the master network node to a bearer or whether the master network node allocates a resource of a secondary network node to a bearer.

Alternatively, the communications device 70 may be the MME network element in the embodiment shown in FIG. 7, and may implement a function of the MME network element in the embodiment shown in FIG. 7. For detailed execution processes of the units in the communications device 70, refer to the execution steps of the MME network element in the embodiment shown in FIG. 7, and details are not described herein again. Because an MME network element provided in this embodiment can perform the rate adjustment method shown in FIG. 7, for technical effects that can be achieved by the MME network element, refer to the embodiment shown in FIG. 7, and details are not described herein again.

If the communications device 70 is the session management network element in FIG. 5, the first processing unit 7011 is configured to determine access information indicating whether a terminal uses NR for access, and the second processing unit 7012 is configured to: determine first session-AMBR information based on the access information.

In a possible implementation, the transceiver unit 702 is configured to receive, by the session management network element, a first message from an access management network element, where the first message includes first indication information, and the first indication information is used to indicate whether the terminal uses NR for access.

The first processing unit 7011 is specifically configured to determine, based on the first indication information, the access information indicating whether the terminal uses NR for access.

In a possible implementation, the second processing unit 7012 is specifically configured to: determine the first session-AMBR information based on the access information and second configuration information. The second configuration information includes session-AMBR information that exists when NR is used for access or session-AMBR information that exists when NR is not used for access.

In a possible implementation, the first message further includes second session-AMBR information. The second session-AMBR information is session-AMBR information suggested by a master network node. The second processing unit 7012 is specifically configured to: determine, by the session management network element, the first session-AMBR information based on the access information and the second session-AMBR information.

In a possible implementation, the transceiver unit 702 is configured to send the first session-AMBR information to a user plane network element. The first session-AMBR information is used to control a data transmission rate.

In a possible implementation, the transceiver unit 702 is configured to: send a policy update request to a policy management network element, where the policy update request includes the access information and the first session-AMBR information, and the access information is used by the policy management network element to determine third session-AMBR information based on the first session-AMBR information; receive a policy update response from the policy management network element, where the policy update response includes the third session-AMBR information; and send the third session-AMBR information to the user plane network element, where the third session-AMBR information is used to control a data transmission rate.

In a possible implementation, the policy update request further includes the second session-AMBR information. The second session-AMBR information is the session-AMBR information suggested by the master network node. The second session-AMBR information and the access information are used by the policy management network element to determine the third session-AMBR information based on the first session-AMBR information.

In a possible implementation, the policy update response further includes fourth indication information. The transceiver unit 702 is configured to: send the fourth indication information to the master network node via the access management network element. The fourth indication information is used to indicate whether the master network node allocates a resource of the master network node to a quality of service flow of a session or whether the master network node allocates a resource of a secondary network node to a quality of service flow of a session.

Alternatively, the communications device 70 may be the SMF network element in the embodiment shown in FIG. 8, and may implement a function of the SMF network element in the embodiment shown in FIG. 8. For detailed execution processes of the units in the communications device 70, refer to the execution steps of the SMF network element in the embodiment shown in FIG. 8, and details are not described herein again. Because an SMF network element provided in this embodiment can perform the rate adjustment method shown in FIG. 8, for technical effects that can be achieved by the SMF network element, refer to the embodiment shown in FIG. 8, and details are not described herein again.

A person of ordinary skill in the art may understand that all or some of the processes of the methods in the embodiments may be implemented by a computer program instructing relevant hardware. The program may be stored in a computer-readable storage medium. When the program runs, the processes of the methods in the embodiments are performed. The foregoing storage medium includes: any medium that can store program code, such as a ROM, a random access memory RAM, a magnetic disk, or a compact disc. Therefore, still another embodiment of this application provides a computer-readable storage medium. The computer-readable storage medium stores an instruction. When the instruction runs on a computer, the computer is enabled to perform the methods described in the foregoing aspects.

Still another embodiment of this application further provides a computer program product including an instruction. When the instruction runs on a computer, the computer is enabled to perform the methods described in the foregoing aspects.

A person of ordinary skill in the art may be aware that, in combination with the example units and algorithm steps described in the embodiments disclosed in this application, this application may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and there may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present invention are all or partially generated. The computer may be a general-purpose computer, a dedicated computer, a computer network, or other programmable apparatuses. The computer instructions may be stored in a computer-readable storage medium, or may be transmitted by using the computer-readable storage medium. The computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid state disk, SSD)), or the like.

What is claimed is:

1. A method, comprising:
   receiving, by a mobility management network element, a first message from a master network node, wherein the first message comprises first indication information, and the first indication information indicates whether a terminal uses new radio (NR) for access, and wherein the first message further comprises second access point name-aggregate maximum bit rate (APN-AMBR) information, and the second APN-AMBR information is APN-AMBR information indicated by the master network node;
   determining, by the mobility management network element based on the first indication information, access information indicating whether the terminal uses NR for accessing the network; and
   determining, by the mobility management network element, first APN-AMBR information for the terminal based on the access information and the second APN-AMBR information.

2. The method according to claim 1, further comprising:
   sending, by the mobility management network element, the first APN-AMBR information to the terminal, wherein the first APN-AMBR information is configured to be used to control a data transmission rate.

3. The method according to claim 1, further comprising:
   sending, by the mobility management network element, a first bearer management request to a serving network element, wherein the first bearer management request comprises the access information, and sending the first bearer management request causes the serving network element to send a second bearer management request to a packet data network element, wherein the second bearer management request comprises the access information, the access information is configured to be used to determine third APN-AMBR information, and the third APN-AMBR information is configured to be used by the packet data network element to control a data transmission rate; and
   receiving, by the mobility management network element, a first bearer management response from the serving network element, wherein the first bearer management response comprises the third APN-AMBR information.

4. The method according to claim 3, wherein the first bearer management request further comprises the second APN-AMBR information, the second bearer management request further comprises the second APN-AMBR information, and the second APN-AMBR information and the access information are configured to be used to determine the third APN-AMBR information.

5. The method according to claim 3, wherein a second bearer management response further comprises fourth indication information, and the first bearer management response further comprises the fourth indication information; and
wherein the method further comprises:
sending, by the mobility management network element, the fourth indication information to the master network node, wherein the fourth indication information indicates whether the master network node allocates a resource of the master network node to a bearer or whether the master network node allocates a resource of a secondary network node to a bearer.

6. The method according to claim 1, wherein the first indication information is dual connectivity indication information.

7. The method according to claim 1, wherein the terminal uses NR for access when the terminal uses NR for next generation node B (gNB) access.

8. The method according to claim 1, wherein the first indication information indicates whether the terminal uses NR for access by indicating a radio access technology type.

9. The method according to claim 1, wherein the master network node is one of two network nodes to which the terminal is dual-connected.

10. The method according to claim 1, wherein the first message is a notification message.

11. The method according to claim 1, wherein the second APN-AMBR information is determined based on actual usage of the master network node.

12. A system, comprising:
a mobility management network element;
a serving network element;
a packet data network element; and
a master network node, wherein the master network node is configured to send a first message to the mobility management network element; and
wherein the mobility management network element is configured to:
receive the first message, wherein the first message comprises first indication information, and the first indication information indicates whether a terminal uses new radio (NR) for accessing a network;
determine, based on the first indication information, access information indicating whether the terminal uses NR for accessing the network; and
determine first access point name-aggregate maximum bit rate (APN-AMBR) information for the terminal based on the access information;
wherein the serving network element is configured to:
receive a first bearer management request from the mobility management network element, wherein the first bearer management request comprises the access information; and
send a second bearer management request to the packet data network element, wherein the second bearer management request comprises the access information;

wherein the packet data network element is configured to:
determine third APN-AMBR information based on the access information; and
send a second bearer management response to the serving network element, wherein the second bearer management response comprises the third APN-AMBR information, and the third APN-AMBR information is configured to be used to control a data transmission rate; and
wherein the serving network element is further configured to send a first bearer management response to the mobility management network element, wherein the first bearer management response comprises the third APN-AMBR information.

13. The system according to claim 12, wherein the first indication information is dual connectivity indication information.

14. The system according to claim 12, wherein the mobility management network element is further configured to:
send the first APN-AMBR information to the terminal, wherein the first APN-AMBR information is configured to be used to control a data transmission rate.

15. The system according to claim 12, wherein the master network node is one of two network nodes to which the terminal is dual-connected.

16. A system, comprising:
a master network node;
a policy management network element;
an access management network element; and
a session management network element;
wherein the access management network element is configured to receive first indication information from the master network node, wherein the first indication information indicates whether a terminal uses new radio (NR) for accessing a network;
wherein the session management network element is configured to:
receive a first message from the access management network element, wherein the first message comprises the first indication information; and
determine first session-aggregate maximum bit rate session (AMBR) information for the terminal based on the first indication information; and
wherein the policy management network element is configured to:
receive a policy update request from the session management network element, wherein the policy update request comprises the first indication information and the first session-AMBR information;
determine third session-AMBR information based on the first indication information and the first session-AMBR information; and
send a policy update response to the session management network element, wherein the policy update response comprises the third session-AMBR information.

17. The system according to claim 16, wherein the access management network element is further configured to:
receive a location of the terminal from the master network node.

18. The system according to claim 17, wherein the access management network element is further configured to:
receive, from the master network node, second indication information indicating a dual-connectivity capability of the master network node.

19. The system according to claim 17, wherein the location of the terminal is a tracking area to which the terminal belongs.

20. The system according to claim 16, wherein the access management network element is further configured to:
 receive, from the terminal, third indication information indicating whether the terminal has a dual-connectivity capability.

* * * * *